US011394596B2

(12) United States Patent
Gao et al.

(10) Patent No.: US 11,394,596 B2
(45) Date of Patent: Jul. 19, 2022

(54) METHOD AND DEVICE FOR DETERMINING BASEBAND PARAMETER

(71) Applicant: China Academy of Telecommunications Technology, Beijing (CN)

(72) Inventors: Xuejuan Gao, Beijing (CN); Fang-Chen Cheng, Beijing (CN); Xueming Pan, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 603 days.

(21) Appl. No.: 16/324,907

(22) PCT Filed: Jul. 3, 2017

(86) PCT No.: PCT/CN2017/091495
§ 371 (c)(1),
(2) Date: Feb. 12, 2019

(87) PCT Pub. No.: WO2018/028347
PCT Pub. Date: Feb. 15, 2018

(65) Prior Publication Data
US 2021/0306198 A1 Sep. 30, 2021

(30) Foreign Application Priority Data

Aug. 12, 2016 (CN) .......................... 201610665828.8

(51) Int. Cl.
*H04L 27/26* (2006.01)
*H04W 56/00* (2009.01)

(52) U.S. Cl.
CPC .... *H04L 27/2666* (2013.01); *H04L 27/26025* (2021.01); *H04W 56/0015* (2013.01)

(58) Field of Classification Search
None
See application file for complete search history.

(56) References Cited

U.S. PATENT DOCUMENTS

2015/0043465 A1    2/2015  Ouchi
2017/0359791 A1*  12/2017  Onggosanusi ........ H04L 5/0023
(Continued)

FOREIGN PATENT DOCUMENTS

| CN | 101986745 A | 3/2011 |
|----|-------------|--------|
| CN | 104717749 A | 6/2015 |
| CN | 104796218 A | 7/2015 |
| CN | 104796242 A | 7/2015 |
| CN | 105580470 A | 5/2016 |
| JP | 2010519838 A | 6/2010 |

(Continued)

OTHER PUBLICATIONS

ITL; "On Frame Structure for NR"; 3GPP TSG RAN WG1 Meeting #85; R1-165242; Nanjing, China; May 23-27, 2016.
(Continued)

*Primary Examiner* — Anh Vu H Ly
(74) *Attorney, Agent, or Firm* — Kilpatrick Townsend & Stockton, LLP

(57) ABSTRACT

Disclosed are a method and device for determining a baseband parameter The method includes: according to an initial synchronization signal it detects, a terminal determining the TRP group to which the terminal belongs; according to a third synchronization signal detected in the TRP group and/or system information of the terminal group, the terminal determining the numerology.

24 Claims, 11 Drawing Sheets

A first network-side device in a TRP group transmits an initial synchronization signal in the TRP group, so that a terminal determines the TRP group to which the terminal belongs, according to the initial synchronization signal, where the initial synchronization signal includes a first synchronization signal and/or a second synchronization signal A second network-side device in the TRP group transmits a third synchronization signal in the TRP group, and/or a third network-side device in the TRP group transmits system information of the TRP group in the TRP group, so that the terminal determines a numerology of the second network-side device, or numerologies of network-side devices within the TRP group according to the third synchronization signal, and/or the system information of the TRP group

(56) References Cited

U.S. PATENT DOCUMENTS

| | | | |
|---|---|---|---|
| 2018/0049169 A1* | 2/2018 | Lin | H04L 5/0051 |
| 2019/0104551 A1* | 4/2019 | Deenoo | H04W 72/0446 |
| 2019/0173721 A1* | 6/2019 | Gao | H04L 27/2666 |

FOREIGN PATENT DOCUMENTS

| | | |
|---|---|---|
| KR | 20160086904 A | 7/2016 |
| WO | 2015046831 A1 | 4/2015 |
| WO | 2015080646 A1 | 6/2015 |

OTHER PUBLICATIONS

LG Electronics, "Overview of new radio Interface design", 3GPP TSG RAN WG1 Meeting #84bis, Busan, Korea Apr. 11-15, 2016, total 4 pages, R1-162512.

Samsung, "Discussion on numerology aspects of NR synchronization signal", 3GP•P TSG RAN WG1 Meeting #86, Gothenburg, Sweden, Aug. 22-26, 2016, total 6 pages, R1-166795.

Nokia et al.,"On System Design for Multiple Numerologies—Initial Access", 3GPP TSG..;RAN WG1 #86, Gothenburg, Sweden, Aug. 22-26, 2016, total 7 pages, R1-167258.

Samsung: "Cell search for NR: design consideration", 3GPP TSG RAN WG1 #85, R1-163997, Nanjing, China, May 23-27, 2016.

Intel Corporation: "Discussion of mobility related definition and terminology in NR", 3GPP TSG RAN WG2 Meeting #94, R2-163578, Nanjing, China, May 23-27, 2016.

Sony, "Synchronisation Signal Design Principles for NB-IoT", 3GPP TSG RAN WG1 Meeting #82bis, R1-155879, Malmö, Sweden, Oct. 5-9, 2015, 2 pages.

Guangdong OPPO Mobile Telecom, "Frame structure supporting flexible parameter allocations", TSG-RAN WG1 #85, R1-164472, Nanjing, China, May 23-27, 2016, 4 pages.

\* cited by examiner

METHOD AND DEVICE FOR DETERMINING BASEBAND PARAMETER

This application is a National Stage of International Application No. PCT/CN2017/091495, filed Jul. 3, 2017, which claims priority to Chinese Patent Application No. 201610665828.8, filed Aug. 12, 2016, both of which are hereby incorporated by reference in their entireties.

FIELD

The present invention relates to the field of communications, and particularly to a method and device for determining a numerology.

BACKGROUND

In existing Long Term Evolution (LTE) systems, frame structures are defined respectively for a Frequency Division Duplex (FDD) mode and a Time Division Duplex (TDD) mode.

A Frame Structure type 1 (FS1) is applicable to an LTE FDD system, and as illustrated in FIG. 1A, there are different carrier frequencies, and a same frame structure, for uplink and downlink transmission. A radio frame with a length of 10 ms includes ten 1 ms sub-frames, and each sub-frame includes two 0.5 ms timeslots. A Transmission Time Interval (TTI) for uplink and downlink data transmission is 1 ms.

A Frame Structure Type 2 (FS2) is applicable to an LTE TDD system, and as illustrated in FIG. 1B, there are different sub-frames or timeslots, on a same frequency, for uplink and downlink transmission. Each 10 ms radio frame includes two 5 ms half-frames, and each half-frame includes five sub-frames with a length of 1 ms. Sub-frames in the FS2 are categorized into three categories: downlink sub-frames, uplink sub-frames and special sub-frames, and each special sub-frame includes three components, which are a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame. Seven TDD uplink-downlink configurations as depicted in Table 1 are defined for different downlink-to-uplink switch-point periodicities and uplink-downlink allocation proportions.

Two Cyclic Prefix (CP) types including a normal CP and an extended CP are defined for the FDD and TDD modes (the numbers of symbols in a normal sub-frame and a special sub-frame are respectively less than that definition below) in the LTE system. For the uplink transmission, a sub-carrier spacing $\Delta f=15$ kHz is defined; with a normal CP, each timeslot includes seven Single Carrier-Frequency Division Multiple Access (SC-FDMA) symbols, where a length of a CP in the first SC-FDMA symbol is 160 Ts, and a length of a CP in each of the other SC-FDMA symbols is 144 Ts; and with an extended CP, each timeslot includes six SC-FDMA symbols, and a length of a CP in each SC-FDMA symbol is 512 Ts. For the downlink transmission, with a normal CP, a sub-carrier spacing $\Delta f=15$ kHz is defined, and each timeslot includes seven Orthogonal Frequency Division Multiplexing (OFDM) symbols, where a length of a CP in the first OFDM symbol is 160 Ts, and a length of a CP in each of the other OFDM symbols is 144 Ts; and with an extended CP, two sub-carrier spacings $\Delta f=15$ kHz and $\Delta f=7.5$ kHz are defined. With the sub-carrier spacing $\Delta f=15$ kHz each timeslot includes six OFDM symbols, and a length of a CP in each OFDM symbol is 512 Ts; and with the sub-carrier spacing $\Delta f=7.5$ kHz, each timeslot includes three OFDM symbols, and a length of a CP in each OFDM symbol is 1024 Ts, where Ts is a system sampling spacing defined as $307200*Ts=10$ ms. $\Delta f=7.5$ only defined for a multicast service, and only applicable to a configured Multimedia Broadcast multicast service Single Frequency Network (MBSFN) sub-frame.

In the LTE system, a User Equipment (UE) (also referred to as a terminal) to access an LTE network shall search for a cell to obtain system information of the cell. There is only one numerology, i.e., a sub-carrier spacing $\Delta f=15$ kHz, for the UE to detect a synchronization signal, and to receive broadcast information and system information, where the sub-carrier spacing corresponds to a fixed number of OFDM symbols and a fixed CP length respectively at a normal CP and an extended CP, so it is not necessary for the UE to identify the numerology. As there is a varying demand for a mobile communication service, the International Telecommunication Union (ITU), the 3rd Generation Partnership Project (3GPP), and other organizations come to research a new wireless communication system (e.g., a 5G system). The new wireless communication system can operate in a higher frequency band, but also can operate in lower and intermediate frequency bands for backward compatibility. Different numerologies shall be defined for the different frequency bands due to their different transmission characteristics and demands. Also different numerologies may be applicable to a same frequency band or a Transmission Reception Point (TRP) with a varying demand. Accordingly a UE operating in the new wireless communication system can transmit data correctly only after the UE identifies a numerology for its operating frequency band. There has been absent so far a definite solution to determining a numerology in the new wireless communication system.

TABLE 1

| | | Uplink-downlink configurations | | | | | | | | | |
|---|---|---|---|---|---|---|---|---|---|---|---|
| Uplink-downlink configuration | Downlink-to-Uplink Switch-point periodicity | Sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

SUMMARY

Embodiments of the invention provide a method and device for determining a numerology so as to address the problem in the prior art that there has been absent so far a definite solution to determining a numerology in a new wireless communication system.

In a first aspect, there is provided a method for determining a numerology, the method including: determining, by a terminal, a Transmission Reception Point (TRP) group to which the terminal belongs according to a detected initial synchronization signal, where the initial synchronization signal includes a first synchronization signal and/or a second synchronization signal; and determining, by the terminal, a numerology according to a third synchronization signal detected in the TRP group, and/or system information of the TRP group.

In a possible implementation, before the determining, by the terminal, the numerology according to the third synchronization signal detected in the TRP group, and/or the system information of the TRP group, the method further includes: detecting, by the terminal, the third synchronization signal according to one of the following ways: detecting, by the terminal, the third synchronization signal on a system bandwidth of the TRP group; or detecting, by the terminal, the third synchronization signal on a predefined transmission resource of the third synchronization signal; or detecting, by the terminal, the third synchronization signal on a transmission resource of a third synchronization signal, indicated in the system information of the TRP group; and/or detecting, by the terminal, the third synchronization signal according to one of the following ways: detecting, by the terminal, the third synchronization signal according to a preset numerology; or determining, by the terminal, a numerology corresponding to a frequency band on which the third synchronization signal is to be detected, according to a correspondence relationship between a frequency band and a numerology, and detecting the third synchronization signal according to the determined numerology; or detecting, by the terminal, the third synchronization signal according to numerologies supported in a communication system; or detecting, by the terminal, the third synchronization signal according to a numerology indicated in the system information of the TRP group; or determining, by the terminal, according to a predefined correspondence relationship between third synchronization signal sequences, and numerologies for sub-bands or TRPs or beams, a numerology of each third synchronization signal sequence; and detecting the third synchronization signal according to the determined numerology; or determining, by the terminal, according to a correspondence relationship, between third synchronization signal sequences, and numerologies for sub-bands or TRPs or beams, indicated in the system information of the TRP group, a numerology of each third synchronization signal sequence; and detecting the third synchronization signal according to the determined numerology.

In a possible implementation, the determining, by the terminal, the numerology according to the third synchronization signal detected in the TRP group, and/or the system information of the TRP group includes: determining, by the terminal, a numerology used by the detected third synchronization signal as a numerology for a sub-band, a TRP, and/or a beam corresponding to the third synchronization signal; or determining, by the terminal, a numerology for a sub-band, a TRP, and/or a beam corresponding to a detected third synchronization signal sequence according to a predefined correspondence relationship between a third synchronization signal sequence, and a numerology for a sub-band or a TRP or a beam; or receiving, by the terminal, TRP-specific system information transmitted by a TRP corresponding to the detected third synchronization signal according to a preset numerology, and determining the numerology according to the TRP-specific system information; or determining, by the terminal, a numerology for a sub-band, a TRP, and/or a beam corresponding to a detected third synchronization signal sequence according to a correspondence relationship, between a third synchronization signal sequence and a numerology for a sub-band or a TRP or a beam, indicated in the system information of the TRP group; or receiving, by the terminal, TRP-specific system information transmitted by a TRP corresponding to the detected third synchronization signal according to a numerology indicated in the system information of the TRP group, and determining the numerology according to the TRP-specific system information; where the TRP-specific system information includes at least one of: a numerology for the TRP, a numerology for each beam in the TRP, or a numerology for the TRP over different time domain resources and/or frequency domain resources; and/or determining, by the terminal, the numerology according to the system information of the TRP group includes: receiving, by the terminal, the system information of the TRP group, where the system information of the TRP group includes at least one of: a numerology for a sub-band corresponding to the TRP group, a numerology for a time domain resource and/or a frequency domain resource corresponding to the TRP group, a numerology for a TRP in the TRP group, or a numerology for a beam corresponding to the TRP group.

In a possible implementation, when the number of detected third synchronization signal sequences is at least two, then determining, by the terminal, the numerology includes: determining, by the terminal, a numerology for a sub-band, a TRP, and/or a beam corresponding to each third synchronization sequence; or selecting, by the terminal, at least one of the at least two third synchronization signal sequences, and determining a numerology for a sub-band, a TRP, and/or a beam corresponding to the selected third synchronization signal sequence.

Furthermore the selecting, by the terminal, the at least one of the at least two third synchronization signal sequences includes: selecting, by the terminal, the at least one of the at least two third synchronization signal sequences according to received energies, signal strengths, and/or received qualities of the at least two third synchronization signal sequences; or reporting, by the terminal, the at least two third synchronization signal sequences to a network-side, and receiving the at least one of the at least two third synchronization signal sequence notified by the network-side.

In a possible implementation, the transmission resource is a time domain resource and/or a frequency domain resource occupied by the third synchronization signal, or a time domain window and/or a frequency domain window for detecting the third synchronization signal.

In a possible implementation, when the transmission resources is the time domain resource and/or the frequency domain resource occupied by the third synchronization signal, then the terminal detects the third synchronization signal according to a synchronization relationship, between the terminal and the TRP group, determined based upon the initial synchronization signal; and when the transmission resource is the time domain window and/or the frequency domain window for detecting the third synchronization signal, then the terminal detects blindly within the time domain window and/or the frequency domain window for the third synchronization signal, and obtains a synchronization relationship between the terminal, and a sub-band or a TRP or a beam corresponding to the time domain window and/or the frequency domain window according to the third synchronization signal.

In a second aspect, there is provided a method for determining a numerology, the method including: transmitting, by a first network-side device in a Transmission Reception Point (TRP) group, an initial synchronization signal in the TRP group, so that a terminal determines the TRP group to which the terminal belongs, according to the initial synchronization signal, where the initial synchronization signal includes a first synchronization signal and/or a second synchronization signal; transmitting, by a second network-side device in the TRP group, a third synchronization signal in the TRP group, and/or transmitting, by a third network-side device in the TRP group, system information of the TRP group in the TRP group, so that the terminal determines a numerology of the second network-side device, or numerologies of network-side devices within the TRP group according to the third synchronization signal and/or the system information of the TRP group.

In a possible implementation, transmitting, by the second network-side device in the TRP group, the third synchronization signal in the TRP group according to one of the following ways: transmitting, by the second network-side device, the third synchronization signal in an operating bandwidth corresponding to the second network-side device, in a system bandwidth of the TRP group; or transmitting, by the second network-side device, the third synchronization signal over a predefined transmission resource of the third synchronization signal; or transmitting, by the second network-side device, the third synchronization signal over a transmission resource of the third synchronization signal indicated in the system information of the TRP group; and/or transmitting, by the second network-side device in the TRP group, the third synchronization signal in the TRP group according to one of the following ways: determining, by the second network-side device, a numerology corresponding to a frequency band on which the third synchronization signal is to be transmitted, according to a correspondence relationship between a frequency band and a numerology, and transmitting the third synchronization signal according to the determined numerology; or determining, by the second network-side device, a third synchronization signal sequence corresponding to the numerology of the second network-side device, according to a correspondence relationship, between a third synchronization signal sequence and a numerology, predefined, or indicated in the system information of the TRP group, and transmitting the third synchronization signal sequence corresponding to the numerology of the second network-side device according to a preset numerology, or any one of a plurality of numerologies defined in a communication system, or a numerology indicated in the system information of the TRP group, or the numerology of the second network-side device; or determining, by the second network-side device, a third synchronization signal sequence corresponding to the second network-side device, according to a correspondence relationship, between a third synchronization signal sequence and a network-side device, predefined, or indicated in the system information of the TRP group, and transmitting the third synchronization signal sequence corresponding to the second network-side device according to the numerology of the second network-side device.

In a possible implementation, the system information of the TRP group includes at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, or a numerology for each network-side device in the TRP group over different time domain resources and/or frequency domain resources.

In a possible implementation, the system information of the TRP group indicates a correspondence relationship between a third synchronization signal sequence and a numerology; or the system information of the TRP group indicates a numerology or numerologies; or the system information of the TRP group indicates a transmission resource of the third synchronization signal.

In a possible implementation, the method further includes: transmitting, by the second network-side device, specific system information of the second network-side device according to a predefined numerology, or a numerology indicated in the system information of the TRP group, or a default numerology of the second network-side device, where the specific system information includes at least one of: a numerology for the network-side device, a numerology for each beam in the network-side device, or a numerology for the network-side device over different time domain resources and/or frequency domain resources; and/or receiving, by the second network-side device or the third network-side device, a plurality of third synchronization signal sequences reported by the terminal, selecting one or more of the plurality of third synchronization signal sequences, and notifying the terminal of the selected third synchronization signal sequence or sequences; and/or the first network-side device or the second network-side device or the third network-side device is a TRP or a base station in the TRP group.

In a third aspect, there is provided a terminal including: a Transmission Reception Point (TRP) group determining module configured to determine a TRP group to which the terminal belongs according to a detected initial synchronization signal, where the initial synchronization signal includes a first synchronization signal and/or a second synchronization signal; and a numerology determining module configured to determine a numerology according to a third synchronization signal detected in the TRP group, and/or system information of the TRP group.

In a possible implementation, the numerology determining module is further configured to: detect the third synchronization signal on a system bandwidth of the TRP group; or detect the third synchronization signal on a predefined transmission resource of the third synchronization signal; or detect the third synchronization signal on a transmission resource of the third synchronization signal, indicated in the system information of the TRP group.

In a possible implementation, the numerology determining module is further configured to: detect the third synchronization signal according to a preset numerology; or determine a numerology corresponding to a frequency band on which the third synchronization signal is to be detected, according to a correspondence relationship between a frequency band and a numerology, and detect the third synchronization signal according to the determined numerology; or detect the third synchronization signal according to numerologies supported in a communication system; or detect the third synchronization signal according to a numerology indicated in the system information of the TRP group; or determine according to a predefined correspondence relationship between third synchronization signal sequences, and numerologies for sub-bands or TRPs or beams, a numerology of each third synchronization signal sequence and detect the third synchronization signal according to the determined numerologies; or determine, according to a correspondence relationship, between third synchronization signal sequences, and numerologies for sub-bands or TRPs or beams, indicated in the system information of the TRP group, a numerology of each third synchronization signal sequence and detect the third synchronization signal according to the determined numerology.

In a possible implementation, the numerology determining module is configured to: determine a numerology used by the detected third synchronization signal as a numerology for a sub-band, a TRP, and/or a beam corresponding to the third synchronization signal; or determine a numerology for a sub-band, a TRP, and/or a beam corresponding to a detected third synchronization signal sequence according to a predefined correspondence relationship between a third synchronization signal sequence, and a numerology for a sub-band or a TRP or a beam; or receive TRP-specific system information transmitted by a TRP corresponding to the detected third synchronization signal according to a preset numerology, and determine the numerology according to the TRP-specific system information; or determine a numerology for a sub-band, a TRP, and/or a beam corresponding to a detected third synchronization signal sequence according to a correspondence relationship, between a third synchronization signal sequence, and a numerology for a sub-band or a TRP or a beam, indicated in the system information of the TRP group; or receive TRP-specific system information transmitted by a TRP corresponding to the detected third synchronization signal according to a numerology indicated in the system information of the TRP group, and determine the numerology according to the TRP-specific system information; where the TRP-specific system information includes at least one of: a numerology for the TRP, a numerology for each beam in the TRP, or a numerology for the TRP over different time domain resources and/or frequency domain resources.

In a possible implementation, when the number of detected third synchronization signal sequences is at least two, then the numerology determining module is configured to: determine a numerology for a sub-band, a TRP, and/or a beam corresponding to each third synchronization sequence; or select at least one of the at least two third synchronization signal sequences, and determine a numerology for a sub-band, a TRP, and/or a beam corresponding to the at least one selected third synchronization signal sequence.

In a possible implementation, the numerology determining module is configured to: select at least one of the at least two third synchronization signal sequences according to received energies, signal strengths, and/or received qualities of the at least two third synchronization signal sequences; or report the at least two third synchronization signal sequences to a network-side, and receive the at least one of the at least two third synchronization signal sequences notified by the network-side.

In a possible implementation, the numerology determining module is configured: to receive the system information of the TRP group, where the system information of the TRP group includes at least one of: a numerology for a sub-band corresponding to the TRP group, a numerology for a time domain resource and/or a frequency domain resource corresponding to the TRP group, a numerology for a TRP in the TRP group, or a numerology for a beam corresponding to the TRP group.

In a possible implementation, the transmission resource is a time domain resource and/or a frequency domain resource occupied by the third synchronization signal, or a time domain window and/or a frequency domain window for detecting the third synchronization signal.

Furthermore when the transmission resource is the time domain resource and/or the frequency domain resource occupied by the third synchronization signal, then the numerology determining module is configured to detect the third synchronization signal according to a synchronization relationship, between the terminal and the TRP group, determined based upon the initial synchronization signal; and when the transmission resources is the time domain window and/or the frequency domain window for detecting the third synchronization signal, then the numerology determining module is configured to detect blindly within the time domain window and/or the frequency domain window for the third synchronization signal, and to obtain a synchronization relationship between the terminal, and a sub-band or a TRP or a beam corresponding to the time domain window and/or the frequency domain window according to the third synchronization signal.

In a possible implementation, a correspondence relationship between a third synchronization signal and a sub-band or a TRP or a beam is determined in a predefined manner, or notified in the system information of the TRP group.

In a possible implementation, the terminal further includes: a transmitting module configured to subsequently transmit data over a TRP or a sub-band or a beam in the TRP group according to the numerology determined by the numerology determining module.

In a fourth aspect, there is provided a terminal including: a transceiver, and at least one processor connected with the transceiver, where: the at least one processor is configured to read and execute program in a memory: to determine a Transmission Reception Point (TRP) group to which the terminal belongs according to a detected initial synchronization signal, where the initial synchronization signal includes a first synchronization signal and/or a second synchronization signal; and to determine a numerology according to a third synchronization signal detected in the TRP group, and/or system information of the TRP group; and the transceiver is configured to receive and transmit data under the control of the processor.

In a possible implementation, the at least one processor is further configured to read and execute the program in the memory: to detect the third synchronization signal on a system bandwidth of the TRP group; or to detect the third synchronization signal on a predefined transmission resource of the third synchronization signal; or to detect the third synchronization signal on a transmission resource of a third synchronization signal, indicated in the system information of the TRP group; and/or the at least one processor is further configured to read and execute the program in the memory: to detect the third synchronization signal according to a preset numerology; or to determine a numerology corresponding to a frequency band on which the third synchronization signal is to be detected, according to a correspondence relationship between a frequency band and a numerology, and to detect the third synchronization signal according to the determined numerology; or to detect the third synchronization signal according to numerologies supported in a communication system; or to detect the third synchronization signal according to a numerology indicated in the system information of the TRP group; or to determine, according to a predefined correspondence relationship between third synchronization signal sequences, and numerologies for sub-bands or TRPs or beams, a numerology of each third synchronization signal sequence and to detect the third synchronization signal according to the determined numerology; or to determine, according to a correspondence relationship, between third synchronization signal sequences and numerologies for sub-bands or TRPs or beams, indicated in the system information of the TRP group, a numerology of each third synchronization signal sequence and to detect the third synchronization signal according to the determined numerology.

In a possible implementation, the at least one processor is configured to read and execute the program in the memory: to determine a numerology used by the detected third synchronization signal as a numerology for a sub-band, a TRP, and/or a beam corresponding to the third synchronization signal; or to determine a numerology for a sub-band, a TRP, and/or a beam corresponding to a detected third synchronization signal sequence according to a predefined correspondence relationship between a third synchronization signal sequence, and a numerology for a sub-band or a TRP or a beam; or to receive TRP-specific system information transmitted by a TRP corresponding to the detected third synchronization signal according to a preset numerology, and to determine a numerology according to the TRP-specific system information; or to determine a numerology for a sub-band, a TRP, and/or a beam corresponding to a detected third synchronization signal sequence according to a correspondence relationship, between a third synchronization signal sequence, and a numerology for a sub-band or a TRP or a beam, indicated in the system information of the TRP group; or to receive TRP-specific system information transmitted by a TRP corresponding to the detected third synchronization signal according to a numerology indicated in the system information of the TRP group, and to determine the numerology according to the TRP-specific system information; where the TRP-specific system information includes at least one of: a numerology for the TRP, a numerology for each beam in the TRP, or a numerology for the TRP over different time domain resources and/or frequency domain resources; and/or to receive the system information of the TRP group through the transceiver, where the system information of the TRP group includes at least one of: a numerology for a sub-band corresponding to the TRP group, a numerology for a time domain resource and/or a frequency domain resource corresponding to the TRP group, a numerology for a TRP in the TRP group, or a numerology for a beam corresponding to the TRP group.

In a possible implementation, when the number of detected third synchronization signal sequences is at least two, then the at least one processor is configured to read and execute the program in the memory: to determine a numerology for a sub-band, a TRP, and/or a beam corresponding to each third synchronization sequence; or to select at least one of the at least two third synchronization signal sequences, and to determine a numerology for a sub-band, a TRP, and/or a beam corresponding to the selected third synchronization signal sequence.

In a possible implementation, the at least one processor is configured to read and execute the program in the memory: to select the at least one of the at least two third synchronization signal sequences according to received energies, signal strengths, and/or received qualities of the at least two third synchronization signal sequences; or to report the at least two third synchronization signal sequences to a network-side, and to receive the at least one of the at least two third synchronization signal sequences notified by the network-side.

In a possible implementation, the transmission resource is a time resource domain resource and/or a frequency domain resource occupied by the third synchronization signal, or a time window domain and/or a frequency domain window for detecting the third synchronization signal.

Furthermore when the transmission resources is the time domain resource and/or the frequency domain resource occupied by the third synchronization signal, then the at least one processor is configured to read and execute the program in the memory to detect the third synchronization signal according to a synchronization relationship, between the terminal and the TRP group, determined based upon the initial synchronization signal; and when the transmission resource is the time domain window and/or the frequency domain window for detecting the third synchronization signal, then the at least one processor is configured to read and execute the program in the memory to detect blindly within the time domain window and/or the frequency domain window for the third synchronization signal, and to obtain a synchronization relationship between the terminal, and a sub-band or a TRP or a beam corresponding to the time domain window and/or the frequency domain window according to the third synchronization signal.

In a fifth aspect, there is provided a network-side device belonging to a Transmission Reception Point (TRP) group, and including: a transmitting module configured to transmit an initial synchronization signal in the TRP group, so that a terminal determines the TRP group to which the terminal belongs, according to the initial synchronization signal, where the initial synchronization signal includes a first synchronization signal and/or a second synchronization signal; and to transmit a third synchronization signal, and/or system information of the TRP group, in the TRP group, so that the terminal determines a numerology of the network-side device, or numerologies of network-side devices within the TRP group according to the third synchronization signal and/or the system information of the TRP group.

In a possible implementation, the transmitting module is further configured to: transmit the third synchronization signal in an operating bandwidth, corresponding to the network-side device, in a system bandwidth of the TRP group; or transmit the third synchronization signal over a predefined transmission resource of the third synchronization signal; or transmit the third synchronization signal over a transmission resource of the third synchronization signal indicated in the system information of the TRP group.

In a possible implementation, the transmitting module is further configured to: determine a numerology corresponding to a frequency band on which the third synchronization signal is to be transmitted, according to a correspondence relationship between a frequency band and a numerology, and transmit the third synchronization signal according to the determined numerology; or determine, the third synchronization signal sequence corresponding to the numerology of the network-side device, according to a correspondence relationship, between a third synchronization signal sequence and a numerology, predefined, or indicated in the system information of the TRP group, and transmit the third synchronization signal sequence corresponding to the numerology of the network-side device according to a preset numerology, or any one of a plurality of numerologies defined in a communication system, or a numerology indicated in the system information of the TRP group, or the numerology of the network-side device; or determine, the third synchronization signal sequence corresponding to the network-side device, according to a correspondence relationship, between a third synchronization signal sequence and a network-side device, predefined, or indicated in the system information of the TRP group, and transmit the third synchronization signal sequence corresponding to the network-side device according to the numerology of the network-side device.

In a possible implementation, the system information of the TRP group includes at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, or a numerology for each network-side device in the TRP group over different time domain resources and/or frequency domain resources.

In a possible implementation, the system information of the TRP group indicates a correspondence relationship between a third synchronization signal sequence and a numerology; or the system information of the TRP group indicates a numerology or numerologies.

In a possible implementation, the system information of the TRP group indicates a transmission resource of the third synchronization signal.

In a possible implementation, the transmitting module is further configured to: transmit specific system information of the network-side device according to a predefined numerology, or a numerology indicated in the system information of the TRP group, or a default numerology of the network-side device, where the specific system information includes at least one of: a numerology for the network-side device, a numerology for each beam in the network-side device, or a numerology for the network-side device over different time domain resources and/or frequency domain resources.

In a possible implementation, the device further includes a receiving module configured to receive a plurality of third synchronization signal sequences reported by the terminal, and to select one or more of the plurality of third synchronization signal sequences; and the transmitting module is further configured to notify the terminal of the third synchronization signal sequence or sequences selected by the receiving module.

Further to any one of the embodiments above, in a possible implementation, the device further includes a data transmitting module configured to subsequently transmit data in an operating bandwidth of the network-side device according to the numerology of the network-side device.

Further to any one of the embodiments above, in a possible implementation, the network-side device is a TRP or a base station in the TRP group.

In a sixth aspect, there is provided a network-side device including: a transceiver, and at least one processor connected with the transceiver, where: the processor is configured to read and execute program in a memory: to control the transceiver to transmit an initial synchronization signal in the TRP group, so that a terminal determines the TRP group to which the terminal belongs, according to the initial synchronization signal, where the initial synchronization signal includes a first synchronization signal and/or a second synchronization signal; and to control the transceiver to transmit a third synchronization signal, and/or system information of the TRP group, in the TRP group so that the terminal determines a numerology of the network-side device, or numerologies of network-side devices within the TRP group according to the third synchronization signal and/or the system information of the TRP group; and the transceiver is configured to receive and transmit data under the control of the processor.

In a possible implementation, the at least one processor is configured to read and execute the program in the memory: to control the transceiver to transmit the third synchronization signal in an operating bandwidth, corresponding to the network-side device, in a system bandwidth of the TRP group; or to control the transceiver to transmit the third synchronization signal over a predefined transmission resource of the third synchronization signal; or to control the transceiver to transmit the third synchronization signal over a transmission resource of the third synchronization signal indicated in the system information of the TRP group; and/or the at least one processor is configured to read and execute the program in the memory: to determine a numerology corresponding to a frequency band on which the third synchronization signal is to be transmitted, according to a correspondence relationship between a frequency band and a numerology, and to control the transceiver to transmit the third synchronization signal according to the determined numerology; or to determine, the third synchronization signal sequence corresponding to the numerology of the network-side device, according to a correspondence relationship, between a third synchronization signal sequence and a numerology, predefined, or indicated in the system information of the TRP group, and to control the transceiver to transmit the third synchronization signal sequence corresponding to the numerology of the network-side device according to a preset numerology, or any one of a plurality of numerologies defined in a communication system, or a numerology indicated in the system information of the TRP group, or the numerology of the network-side device; or to determine, the third synchronization signal sequence corresponding to the network-side device, according to a correspondence relationship, between a third synchronization signal sequence and a network-side device, predefined, or indicated in the system information of the TRP group, and to control the transceiver to transmit the third synchronization signal sequence corresponding to the network-side device according to the numerology of the network-side device.

In a possible implementation, the system information of the TRP group includes at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, and a numerology for each network-side device in the TRP group over different time domain resources and/or frequency domain resources.

In a possible implementation, the system information of the TRP group indicates a correspondence relationship between a third synchronization signal sequence and a numerology; or the system information of the TRP group indicates a numerology or numerologies; or the system information of the TRP group indicates a transmission resource of the third synchronization signal.

In a possible implementation, the at least one processor is further configured to read and execute the program in the memory: to control the transceiver to transmit specific system information of the network-side device according to a predefined numerology, or a numerology indicated in the system information of the TRP group, or a default numerology of the network-side device, where the specific system information includes at least one of: a numerology for the network-side device, a numerology for each beam in the network-side device, or a numerology for the network-side device over different time domain resources and/or frequency domain resources; and/or to control the transceiver to receive a plurality of third synchronization signal sequences reported by the terminal, and to select one or more of the plurality of third synchronization signal sequences; and to control the transceiver to notify the terminal of the selected third synchronization signal sequence or sequences; and/or the network-side device is a TRP or a base station in the TRP group.

In a seventh aspect, there is provided a computer readable storage medium storing executable program codes configured to perform the method according to the first aspect.

In an eighth aspect, there is provided a computer readable storage medium storing executable program codes configured to perform the method according to the second aspect.

In the methods and devices according to the embodiments of the invention, the terminal firstly determines the TRP group to which the terminal belongs, and is synchronized with the TRP group; and then detects the TRP group for the third synchronization signal, and/or the system information of the TRP group, so that it can identify correctly numerologies corresponding to different sub-bands, different TRPs, and/or different beams in the TRP group, and thus be synchronized with the different sub-bands, the different TRPs, and/or the different beams in the TRP group, and in this way, the terminal can operate over the corresponding sub-bands, TRPs, and/or beams according to the correct numerologies.

DETAILED DESCRIPTION OF THE EMBODIMENTS

Figure 1A:
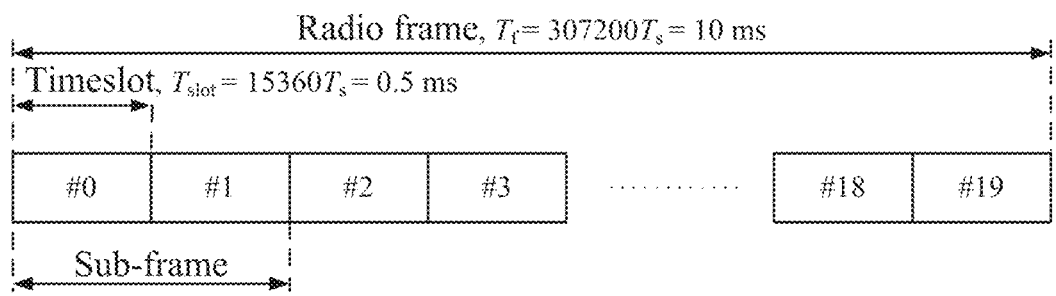
FIG. 1A is a schematic diagram of the frame structure type 1 in the LTE FDD system.
Figure 1B:
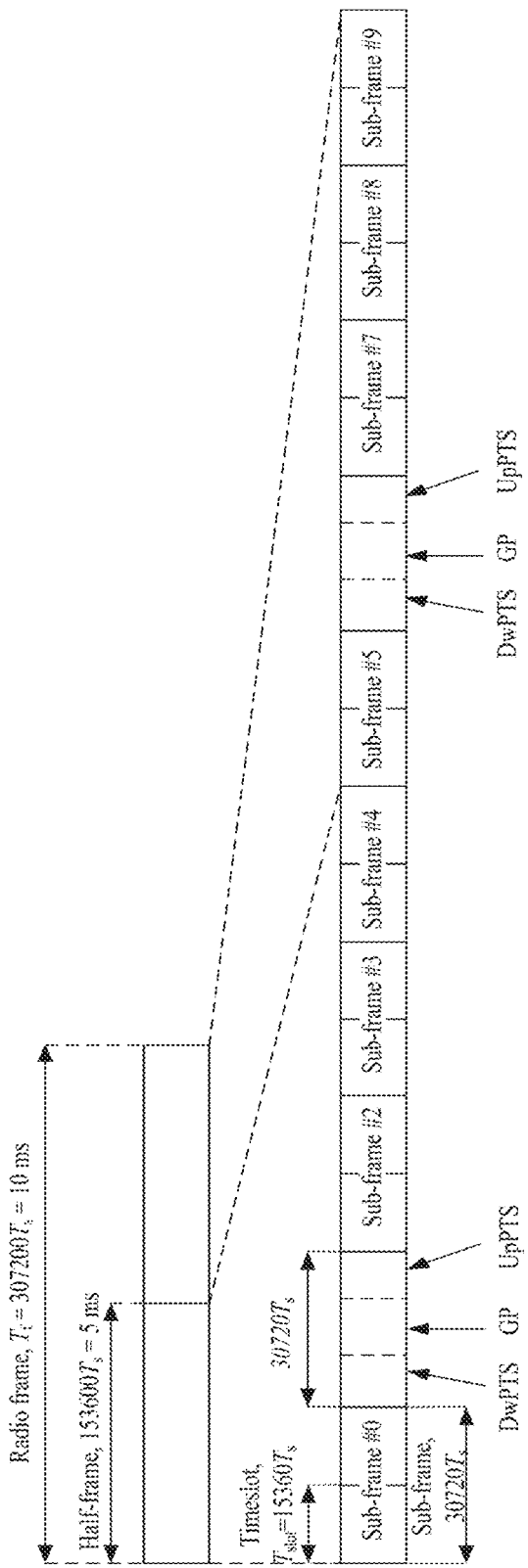
FIG. 1B is a schematic diagram of the frame structure type 2 in the LTE FDD system.

In order to make the objects, technical solutions and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Firstly, a plurality of technical terms as referred to in the embodiments of the invention will be explained.

In the embodiments of the invention, TRPs deployed in a communication system are grouped into a plurality of TRP groups, for example, according to System Information Area (SIA), that is, an SIA is a TRP group, and each TRP group has following characteristics: there is a separate TRP group ID of the TRP group; there is a group-specific synchronization signal in the TRP group, e.g., there may be only one synchronization signal, e.g., only a first synchronization signal sync1, or there may be a plurality of synchronization signals, e.g., a first synchronization signal sync1 and a second synchronization signal sync2, where the group-specific synchronization signal is applicable to all the TRPs in the TRP group or the SIA; there is group-specific system information in the TRP group, where the group-specific system information can also be referred to as necessary system information including information necessary to reside in or access the TRP group, and can be particularly represented as a Master Information Block (MIB) and a System Information Block (SIB), that is, the group-specific system information is configuration information applicable to all the TRPs in the TRP group or the SIA; an idle terminal can reside in the TRP group; and the TRP group can include at least one TRP/beam, where if the TRP group includes a plurality of TRPs/beams, then the different TRPs/beams can be synchronous or asynchronous with each other.

In the embodiments of the invention, the TRP/beam has following characteristics: there is an ID of each TRP, and if the TRP includes a plurality of beams, then there will be an ID of each beam; each ID corresponds to one or more synchronization signal sequences for identifying the ID, e.g., a third synchronization signal(s); a transmission bandwidth of each TRP/beam can be an entire system bandwidth, or a part of frequency domain resources in the system bandwidth, e.g., one or more sub-bands in the system bandwidth; and different numerologies may be applicable to each TRP/beam over different frequency domain resources in a transmission bandwidth of the TRP or beam, and/or different numerologies may be applicable to each TRP or beam over different time domain resources in the transmission bandwidth of the TRP or beam.

In the embodiments of the invention, the numerology includes but will not be limited to at least one of an OFDM symbol length, a CP length, or a sub-carrier spacing, etc.

"A or the plurality of", etc., as referred to in the embodiments of the invention refer to two or more; and "/" represents "and/or", where "and/or" describes one of three possible associative relationships of associated objects, and for example, A and/or B represents three instances of A alone, both A and B, and B alone.

The embodiments of the invention will be described below in further details with reference to the drawings. It shall be appreciated that the embodiments to be described below are only intended to illustrate and explain the invention, but not to limit the invention thereto.

Figure 2A:
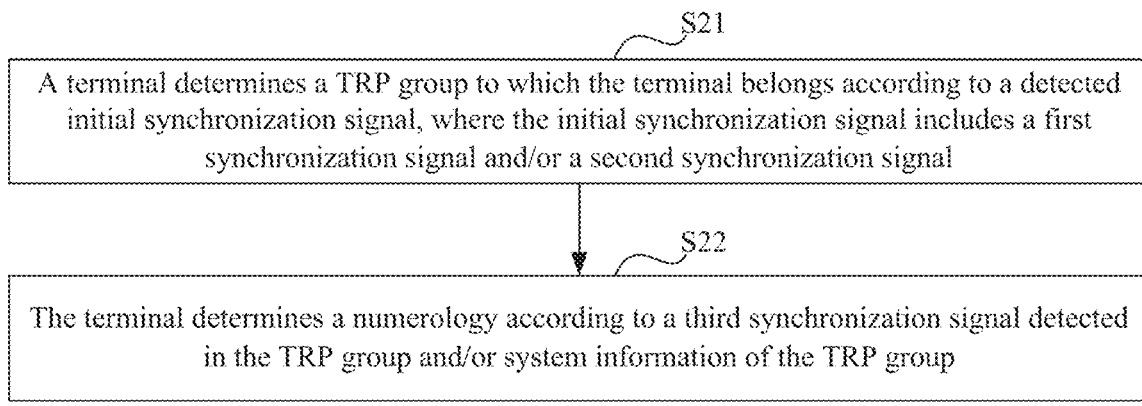
FIG. 2A is a schematic diagram of a method for determining a numerology at the terminal side according to the embodiments of the invention.

FIG. 2A illustrates a method for determining a numerology at the terminal side according to an embodiment of the invention, where the method includes the following operations: in the operation S21, a terminal determines a TRP group to which the terminal belongs according to a detected initial synchronization signal, where the initial synchronization signal includes a first synchronization signal and/or a second synchronization signal; and in the operation S22, the terminal determines a numerology according to a third synchronization signal detected in the TRP group, and/or system information of the TRP group.

Here the system information of the TRP group is configuration information applicable to all the TRPs in the TRP group, and transmitted by a part or all of TRPs in the TRP group. For example, the system information is transmitted by all the TRPs in the TRP group, or transmitted by one or more TRPs in the TRP group, or transmitted by a part or all of TRPs operating in some frequency bands (e.g., a low frequency band) in the TRP group.

In the operation S22, the third synchronization signal detected by the terminal in the TRP group represents such a third synchronization signal received by the terminal that has an energy, a signal strength, and/or a received quality above a preset threshold; or is embodied as a detected third synchronization signal with the highest energy, signal strength, and/or received quality.

Here the received quality includes but will not be limited to a Reference Signal Received Power (RSRP), a Reference Signal Received Quality (RSRQ), etc.

Optionally the third synchronization signal includes only one synchronization signal, or includes a plurality of synchronization signals; and the third synchronization signal includes but will not be limited to at least one of a Primary Synchronization Signal (PSS), a Secondary Synchronization Signal (SSS), or a sub-band detection signal.

In the embodiments of the invention, the terminal firstly determines the TRP group to which the terminal belongs, and is synchronized with the TRP group; and then detects the TRP group for the third synchronization signal, and/or the system information of the TRP group, so that the terminal can identify correctly numerologies corresponding to different sub-bands, different TRPs, and/or different beams in the TRP group, and thus be synchronized with the different sub-bands, the different TRPs, and/or the different beams in the TRP group, and in this way, the terminal can operate over the corresponding sub-bands, TRPs, and/or beams according to the correct numerologies.

In the embodiments of the invention, the first synchronization signal and the second synchronization signal are synchronization signals transmitted over different time domain resources and/or different frequency domain resources.

In this implementation, the terminal detects an initial synchronization signal according to a default numerology, where the default numerology is one or more predefined numerologies; or the default numerology is one or more numerologies supported or defined by a communication system; or there is a correspondence relationship between a default numerology and a frequency band, and the terminal determines a numerology corresponding to a frequency band on which an initial synchronization signal is to be detected by the terminal, according to the correspondence relationship between a frequency band and a default numerology, and detects the current frequency band for the initial synchronization signal according to the determined numerology. For example, three numerologies are defined as depicted in Table 2, where a numerology 1 and a numerology 2 are defined for a frequency band 1, and a numerology 3 is defined for a frequency band 2; in another example, a numerology 1 is defined for a frequency band 1, a numerology 2 is defined for a frequency band 2, and a numerology 3 is defined for a frequency band 3; etc.

Here a possible definition of the three numerologies is as depicted in Table 2.

TABLE 2

|  | Set 1 (numerology 1) | Set 2 (numerology 2) | Set 3 (numerology 3) |
|---|---|---|---|
| Sub-carrier spacing | 15 kHz | 60 kHz | 240 kHz |
| Component Carrier Bandwidth (MHz) | 1.4, 3, 5, 10, 20 MHz | 20, 40, 80 MHz | 20, 40, 80, 160, 320 MHz |
| OFDM symbol length (ps) | 66.67 μs | 16.67 μs | 4.17 μs |
| Cyclic prefix | ~4.8 μs | ~1.2 μs | ~0.3 μs |
| The number of OFDM Symbols per sub-frame | 1 | 4 | 16 |
| Sub-frame Length (ms) | 0.0715 ms | 0.0715 ms | 0.0715 ms |
| Frame Length (ms) | 10 ms | 10 ms | 10 ms |
| Note  fast Fourier transform (FFT) Size | 128, 256, 512, 1024, 2048 | 512, 1024, 2048 | 128, 256, 512, 1024, 2048 |

A possible implementation of a correspondence relationship between a frequency band and a default numerology is as depicted in Table 3.

TABLE 3

| Frequency band | Frequency band 1: 2 GHz | Frequency band 2: 4GHz ~ 30 GHz | Frequency band 3: >30 GHz |
|---|---|---|---|
| Numerology | Numerology 1 | Numerology 2 | Numerology 3 |

Another possible implementation of a correspondence relationship between a frequency band and a default numerology is as depicted in Table 4.

TABLE 4

| Frequency band | Frequency band 1: below 6 GHz | Frequency band 2: 6 GHz and above |
|---|---|---|
| Numerology | Numerology 1, Numerology 2 | Numerology 3 |

In this implementation, if there are a plurality of default numerologies, then the terminal detects blindly the initial synchronization signal according to the respective default numerologies.

In this implementation, the terminal detects a predefined time domain resource and/or frequency domain resource for the initial synchronization signal.

In this implementation, the terminal determines the TRP group to which the terminal belongs according to the detected initial synchronization signal in the following possible implementation: the terminal selects an initial synchronization signal with the highest signal strength from detected initial synchronization signals; the terminal determines a TRP group ID corresponding to the selected initial synchronization signal according to a correspondence relationship between an initial synchronization signal and a TRP group ID; the terminal determines a TRP group corresponding to the determined TRP group ID as the TRP group to which the terminal belongs; and the terminal further determines a synchronization relationship between the terminal, and the TRP group to which the terminal belongs based upon the initial synchronization signal.

Here the synchronization relationship is subsequently used for downlink reception in the TRP group, for example, to receive necessary system information of the TRP group, to detect an access synchronization signal, etc.

Further to any one of the embodiments above, before the terminal determines the numerology according to the third synchronization signal, and/or the system information of the TRP group, detected in the TRP group in the operation S22, the method further includes: the terminal detects the TRP group for the third synchronization signal, particularly in the following three possible implementations.

In an implementation A, the terminal detects the third synchronization signal on a system bandwidth of the TRP group.

Here the system bandwidth of the TRP group is determined in a predefined manner, or notified in the system information of the TRP group.

In an implementation B, the terminal detects the third synchronization signal on a predefined transmission resource of the third synchronization signal.

Here the predefined transmission resource of the third synchronization signal is the same as a transmission resource of the initial synchronization signal, or is a fixed frequency resource in a system bandwidth.

In an implementation C, the terminal detects the third synchronization signal on a transmission resource of the third synchronization signal, indicated in the system information of the TRP group.

In the embodiments of the invention, the transmission resource is a time domain resource and/or a frequency domain resource occupied by the third synchronization signal, i.e., a particular resource position and size; or a time domain window and/or a frequency domain window for detecting the third synchronization signal, i.e., a detection time domain range and/or a detection frequency domain range, where this range is larger than a time domain resource and/or a frequency domain resource occupied by the third synchronization signal.

Here if the transmission resource is the time domain resource and/or the frequency domain resource occupied by the third synchronization signal, then the terminal will detect the third synchronization signal on the time domain resource and the frequency domain resource occupied by the third synchronization signal, according to the synchronization relationship between the terminal and the TRP group; and if the transmission resource is the time domain window and/or the frequency domain window for detecting the third synchronization signal, then the terminal will detect blindly the third synchronization signal within the time domain window and/or the frequency domain window, and obtain a synchronization relationship between the terminal, and a sub-band, a TRP, or a beam corresponding to the time domain window and/or the frequency domain window according to the third synchronization signal.

Further to any one of the embodiments above, the terminal detects the third synchronization signal within the TRP group in the following several possible implementations.

In a first implementation, the terminal detects the third synchronization signal based upon a preset numerology.

In this implementation, one or more numerologies for detecting the third synchronization signal is or are preset.

In this implementation, if there are a plurality of preset numerologies for detecting the third synchronization signal, then the terminal will detect blindly the third synchronization signal according to each of the plurality of numerologies.

In this implementation, the preset numerology may or may not be the same as a numerology for detecting the initial synchronization signal.

In a second implementation, the terminal determines a numerology corresponding to a frequency band on which the third synchronization signal is to be detected by the terminal, according to a correspondence relationship between a frequency band and a numerology, and detects the third synchronization signal according to the determined numerology.

In this implementation, the correspondence relationship between a frequency band and a numerology is preset, and for a particular implementation thereof, reference can be made to the correspondence relationship above between a frequency band and a default numerology.

Here the correspondence relationship between a frequency band and a numerology may be the same as the correspondence relationship above between a frequency band and a default numerology.

In this implementation, if there are a plurality of determined numerologies corresponding to the frequency band on which the third synchronization signal is to be detected, then the terminal will detect blindly the third synchronization signal according to each of the plurality of numerologies.

In a third implementation, the terminal detects the third synchronization signal according to a numerology supported by a communication system.

In this implementation, if there are a plurality of numerologies supported by the communication system, then the terminal will detect blindly the third synchronization signal according to each of the plurality of numerologies.

In a fourth implementation, the terminal detects the third synchronization signal according to a numerology indicated in the system information of the TRP group.

In this implementation, the system information of the TRP group carries a numerology for indicating detection of the third synchronization signal.

In this implementation, if there are a plurality of numerologies indicated in the system information, then the terminal will blindly the third synchronization signal according to each of the plurality of numerologies.

In a fifth implementation, the terminal determines a numerology of each third synchronization signal sequence according to a predefined correspondence relationship between a third synchronization signal sequence, and a numerology for a sub-band or a TRP or a beam, and detects the third synchronization signal according to the determined numerology.

In this implementation, the terminal detects blindly the third synchronization signal according to a numerology of each third synchronization signal sequence.

In a sixth implementation, the terminal determines a numerology of each third synchronization signal sequence according to a correspondence relationship, between a third synchronization signal sequence, and a numerology for a sub-band or a TRP or a beam, indicated in the system information of the TRP group, and detects the third synchronization signal according to the determined numerology.

In the first to fourth implementations above, the numerology for transmitting the third synchronization signal is different from the numerology of the corresponding sub-band or TRP or beam determined according to the third synchronization signal.

Further to any one of the embodiments above, the terminal determines the numerology according to the third synchronization signal, and/or the system information of the TRP group, detected in the TRP group in the operation S22 in the following several possible implementations.

In an implementation a, the terminal determines a numerology used by the detected third synchronization signal, as a numerology for a sub-band, a TRP, and/or a beam corresponding to the third synchronization signal.

In an implementation b, the terminal determines a numerology for a sub-band, a TRP, and/or a beam corresponding to a detected third synchronization signal sequence according to a predefined correspondence relationship between a third synchronization signal sequence, and a numerology for a sub-band or a TRP or a beam.

In an implementation c, the terminal determines a numerology for a sub-band, a TRP, and/or a beam corresponding to a detected third synchronization signal sequence according to a correspondence relationship, between a third synchronization signal sequence, and a numerology for a sub-band or a TRP or a beam, indicated in the system information.

In the implementations a, b, and c, if the number of detected third synchronization signal sequences is at least two, then the terminal will determine the numerologies as follows: the terminal determines a numerology for a sub-band, a TRP, and/or a beam corresponding to each third synchronization signal sequence; or the terminal selects at least one of the at least two third synchronization signal sequences, and determines a numerology for a sub-band, a TRP, and/or a beam corresponding to the selected third synchronization signal sequence.

Furthermore the terminal selects at least one of the at least two third synchronization signal sequences as follows: the terminal selects at least one of the at least two third synchronization signal sequences according to received energies, signal strengths, and/or received qualities (e.g., RSRP, RSRQs, etc.) of the at least two third synchronization signal sequences; or the terminal reports the at least two third synchronization signal sequences to a network-side, and receives at least one third synchronization signal sequence notified by the network-side.

For example, the terminal selects one or more third synchronization signal sequences with the highest received energy or energies, signal strength(s), and/or received quality (or qualities) from the at least two third synchronization signal sequences. In another example, if there are equivalent received energies, signal strengths, and/or received qualities of the at least two third synchronization signal sequences, then the terminal will select randomly one or more of the third synchronization signal sequences.

In an implementation d, the terminal receives TRP-specific system information transmitted by a TRP corresponding to the detected third synchronization signal, according to a preset numerology; and determines a numerology according to the TRP-specific system information.

In an implementation e, the terminal receives TRP-specific system information transmitted by a TRP corresponding to the detected third synchronization signal, according to a numerology indicated in the system information; and determines a numerology according to the TRP-specific system information.

In the implementation d and the implementation e, the TRP-specific system information is configuration information applicable to the TRP transmitting the TRP-specific system information. The TRP-specific system information includes at least one of a numerology for the TRP, a numerology for each beam in the TRP, or a numerology for the TRP over different time domain resources and/or frequency domain resources.

In the embodiments of the invention, the sub-bands are bandwidth parts into which the system bandwidth is divided in advance, where the system bandwidth can be divided in advance in a predefined manner, and for example, the system bandwidth can be divided into P sub-bands under a predefined rule; or the sub-bands can be notified in the system information of the TRP group.

In the embodiments of the invention, a correspondence relationship between a third synchronization signal and a sub-band is determined in a predefined manner, and for example, a transmission resource of each third synchronization signal corresponds to one or more sub-bands including the transmission resource, or each third synchronization signal sequence corresponds to one or more sub-bands including the transmission resource. For example, third synchronization signal sequences 0 to A correspond to a sub-band 0, third synchronization signal sequences A+1 to B correspond to a sub-band 1, and so on. Alternatively the correspondence relationship between a third synchronization signal and a sub-band is notified in the system information of the TRP group, and for example, a correspondence relationship between different third synchronization signal sequences and different sub-bands is notified directly, or a correspondence relationship between different transmission resources of a third synchronization signal, and different sub-bands is notified.

It shall be noted that in the implementations a to e above, if a TRP has only one beam, then the numerology determined by the terminal will be both a numerology for the TRP, and a numerology for the beam. If a TRP has a plurality of beams, then if each of the plurality of beams has a same numerology, then the numerology of the TRP determined by the terminal as described above will be the numerology of each of the plurality of beams; and if there are different numerologies of the respective beams, then the terminal determines a numerology for each beam to thereby obtain a numerology of the TRP over a beam 1, a numerology of the TRP over a beam 2, and so on. If a TRP operates in only one sub-band, then the numerology determined by the terminal will be both a numerology for the TRP, and a numerology for the sub-band. If a TRP operates in a plurality of sub-bands, then if each of the plurality of sub-bands has a same numerology, then the numerology of the TRP determined by the terminal as described above will be the numerology of each of the plurality of sub-bands; and if there are different numerologies of the respective sub-bands, then the terminal determines a numerology for each sub-band to thereby obtain a numerology of the TRP in the sub-band 1, a numerology of the TRP in the sub-band 2, and so on. If a TRP has only one beam, and the TRP operates in only one sub-band, then the numerology determined by the terminal will be a numerology for the TRP, the sub-band, and the beam; and if a TRP has only one beam, and the TRP operates in a plurality of sub-bands, or if a TRP has a plurality of beams, and the TRP operates in only one sub-band, or if a TRP has a plurality of beams, and the TRP operates in a plurality of sub-bands, then numerologies of different sub-bands and different beams of a TRP may be identified in a combination of the instances above.

In the implementations A to C, the first to sixth implementations, and the implementations a to e, if related information is to be obtained from the system information of the TRP group, then before the third synchronization signal is detected, the method will further include receiving the system information of the TRP group.

Particularly the system information of the TRP group is received over a specific time domain resource and frequency domain resource in a preset manner according to the synchronization relationship, between the terminal and the TRP group, obtained based upon the initial synchronization signal.

Methods in a combination of the implementations A to C, the first to sixth implementations, and the implementations a to e will be described below in details in connection with several embodiments thereof. For the sake of a convenient description, the third synchronization signal will be referred to as a synchronization signal 3, and the third synchronization signal sequence will be referred to a synchronization signal 3 sequence, in the following embodiments.

In a first method, the terminal receives system information transmitted in the TRP group, detects a synchronization signal 3 according to an indication of the system information, and further determines a numerology.

In this method, the system information includes at least one or more of transmission resources for detecting the synchronization signal 3 (including a particular time domain resource and/or frequency domain resource, or a time domain window and/or a frequency domain window for detecting the synchronization signal 3), a numerology of the TRP group or the synchronization signal 3, or a correspondence relationship between a synchronization signal 3 sequence, and a numerology for a sub-band or a TRP or a beam.

Here the transmission resource indicated in the system information may be one or more, and the transmission resource may or may not be the same as the transmission resource of the initial synchronization signal. The numerology indicated in the system information may be one or more.

This method further includes the following five possible implementations.

In a method 1-1, the system information indicates at least a transmission resource for detecting a synchronization signal 3.

The terminal detects the synchronization signal 3 on the transmission resource of the synchronization signal 3, according to a preset numerology, or a numerology indicated in the system information, or a plurality of numerologies supported in a communication system, or numerologies, for detecting different synchronization signals, determined according to the correspondence relationship.

There is a correspondence relationship between different synchronization signal 3 sequences, and different numerologies for sub-bands or TRPs or beams, so that the number of blind detections can be reduced, but there are no different numerologies of the same TRP in different sub-bands unless it is predefined that different synchronization signal 3 sequences correspond to a same TRP ID or beam ID. The correspondence relationship is predefined, or indicated in the system information.

Furthermore the terminal determines a numerology of a sub-band or a TRP or a beam corresponding to a synchronization signal 3 sequence detected over a transmission resource of each synchronization signal 3 according to the synchronization signal 3 sequence and the correspondence relationship; or the terminal selects one or more of synchronization signal 3 sequences detected over transmission resources of respective synchronization signals 3, and determines a numerology or numerologies of a sub-band(s) or a TRP(s) or a beam(s) corresponding to the selected synchronization signal 3 sequence(s) according to the selected synchronization signal 3 sequence(s) and the correspondence relationship.

In a method 1-2, the system information indicates at least a transmission resource for detecting a synchronization signal 3, and the terminal detects the transmission resource for detecting the synchronization signal 3, for the synchronization signal 3, according to a plurality of numerologies notified in the system information, or a plurality of numerologies supported in a communication system.

Furthermore the terminal determines a numerology for a synchronization signal 3 sequence detected over the transmission resource of the synchronization signal 3 as a numerology of a sub-band, a TRP, and/or a beam corresponding to the synchronization signal 3; or the terminal determines a numerology or numerologies for one or more of synchronization signal 3 sequences detected over transmission resources of respective synchronization signals 3 as a numerology or numerologies of a sub-band(s) or a TRP(s) or a beam(s) corresponding to the selected synchronization signal 3 sequence(s) according to the selected synchronization signal 3 sequence(s) and the correspondence relationship.

In this method, blind detections are performed by attempting to detect a synchronization signal 3 using different numerologies, and in this method, the number of the blind detections is more than that in the method 1-1, where if there are N synchronization signal 3 sequences in a system, then only N blind detections will be performed in the method 1-1, and N*M blind detections will be performed in the method 1-2, and M is the number of numerologies supported in the system, or defined in the standard. This method is advantageous in that no correspondence relationship between a synchronization signal 3 and a numerology will be predefined or notified, and when a sub-band or a TRP or a beam corresponds to a unique synchronization signal 3 sequence, different numerologies of a sub-band or a TRP or a beam over different frequency domain resources can be supported.

In a method 1-3, the system information indicates at least a numerology of the TRP group, or a numerology for transmitting a synchronization signal 3 in the TRP group.

Here if the system information indicates one numerology, then the same numerology will be applicable to all the transmission instances by default, and the synchronization signal 3 will be only detected to determine a sub-band, a TRP, and/or a beam for the terminal to access.

The terminal detects a system bandwidth of the TRP group, or a predefined transmission resource of the synchronization signal 3, for the synchronization signal 3 according to the numerology indicated in the system information. At this time, the particular position of the synchronization signal 3 in the system bandwidth is unknown, but shall be determined through blind detections, so the system bandwidth can be detected for the synchronization signal 3, in each time domain unit, or the system bandwidth can be detected for the synchronization signal 3 in a predefined part of time domain units.

Here a time domain unit represents the smallest unit for detecting a synchronization signal 3 in the time domain, and for example, if a synchronization signal 3 is transmitted in one OFDM symbol, then each time domain unit will be one OFDM symbol, and if a synchronization signal 3 is transmitted in A OFDM symbols, then every A OFDM symbols will be a time domain unit.

Furthermore the terminal determines a numerology for a detected synchronization signal 3 sequence as a numerology of a sub-band or a TRP or a beam corresponding to the detected synchronization signal 3 sequence; or the terminal determines a numerology or numerologies for selected one or more of detected synchronization signal 3 sequences as a numerology or numerologies of a sub-band(s) or a TRP(s) or a beam(s) corresponding to the selected synchronization signal 3 sequence(s) according to the selected synchronization signal 3 sequence(s) and the correspondence relationship.

In a method 1-4, the system information indicates at least a numerology for transmitting a synchronization signal 3 in the TRP group.

The terminal detects a system bandwidth of the TRP group, or a predefined transmission resource of a synchronization signal 3, for the synchronization signal 3 according to the numerology. At this time, the particular position of the synchronization signal 3 in the system bandwidth is unknown, but shall be determined through blind detections, so the system bandwidth can be detected for the synchronization signal 3, in each time domain unit, or the system bandwidth can be detected for the synchronization signal 3 in a predefined part of time domain units.

There is a correspondence relationship between different synchronization signal 3 sequences, and different numerologies for sub-bands or TRPs or beams, and the correspondence relationship is predefined, or indicated in the system information.

Furthermore the terminal determines a numerology of a sub-band or a TRP or a beam corresponding to a detected synchronization signal 3 sequence according to the detected synchronization signal 3 sequence and the correspondence relationship; or the terminal selects one or more of detected synchronization signal 3 sequences, and determines a numerology or numerologies of a sub-band(s) or a TRP(s) or a beam(s) corresponding to the selected synchronization signal 3 sequence(s) according to the selected synchronization signal 3 sequence(s) and the correspondence relationship.

In the method 1-3 or the method 1-4, when the system information indicates at least two numerologies, the terminal detects blindly the synchronization signal on the system bandwidth according to the at least two numerologies.

In a method 1-5, the system information indicates at least a correspondence relationship between different synchronization signal 3 sequences, and different numerologies for sub-bands or TRPs or beams.

The terminal detects a synchronization signal 3 sequence on a system bandwidth of the TRP group, or a predefined transmission resource of a synchronization signal 3 according to a preset numerology, or a numerology indicated in the system information, or a plurality of numerologies supported in a communication system, or numerologies for detecting different synchronization signal 3 sequences, determined according to the correspondence relationship. At this time, the particular position of the synchronization signal 3 in the system bandwidth is unknown, but shall be determined through blind detections, so the system bandwidth can be detected for the synchronization signal 3, in each time domain unit, or the system bandwidth can be detected for the synchronization signal 3 in a predefined part of time domain units.

Furthermore the terminal determines a numerology of a sub-band or a TRP or a beam corresponding to a detected synchronization signal 3 sequence according to the detected synchronization signal 3 sequence and the correspondence relationship; or the terminal selects one or more of detected synchronization signal 3 sequences, and determines a numerology or numerologies of a sub-band(s) or a TRP(s) or a beam(s) corresponding to the selected synchronization signal 3 sequence(s) according to the selected synchronization signal 3 sequence(s) and the correspondence relationship.

In a method 2, blind detections are performed directly without notifying any information about a synchronization signal in the system information, so the terminal only receives the system information to obtain a system bandwidth, a System Frame Number (SFN), and other parameters, and if these parameters are not necessary to detect a synchronization signal 3, then a synchronization signal 3 may be detected directly without firstly receiving the system information.

The terminal detects the synchronization signal 3 on a system bandwidth of the TRP group, or a predefined transmission resource of a synchronization signal 3, and determines a synchronization signal 3 according to the synchronization signal 3. Furthermore there are the following two possible implementations.

In a method 2-1, the terminal determines a numerology for the detected synchronization signal 3 as a numerology of a sub-band, a TRP, and/or a beam corresponding to the synchronization signal 3; or the terminal selects one or more of detected synchronization signal 3 sequences, and determines a numerology or numerologies for the selected synchronization signal 3 sequence(s) as a numerology or numerologies for a sub-band(s) or a TRP(s) or a beam(s) corresponding to the selected synchronization signal 3 sequence(s) according to the selected synchronization signal 3 sequence(s) and the correspondence relationship.

In a method 2-2, a correspondence relationship between different synchronization signal 3 sequences and different numerologies for sub-bands or TRPs or beams is predefined. The terminal determines a numerology for a sub-band or a TRP or a beam corresponding to a detected synchronization signal 3 sequence according to the synchronization signal 3 sequence and the correspondence relationship; or the terminal selects one or more of detected synchronization signal 3 sequences, and determines a numerology or numerologies for a sub-band(s) or a TRP(s) or a beam(s) corresponding to the selected synchronization signal 3 sequence(s) according to the selected synchronization signal 3 sequence(s) and the correspondence relationship.

In a method 3, the terminal firstly detects a synchronization signal 3, and then receives TRP-specific system information transmitted by a TRP corresponding to the detected synchronization signal 3, and obtains a numerology.

The terminal detects a system bandwidth of the TRP group, or a predefined transmission resource of a synchronization signal 3, or a transmission resource of a synchronization signal 3 indicated in the system information, for a synchronization signal 3 according to a predefined numerology, or a numerology indicated in the system information, or a plurality of numerologies supported in a communication system.

Furthermore the terminal receives the TRP-specific system information transmitted by the TRP corresponding to the synchronization signal 3 according to the predefined numerology, or the numerology indicated in the system information, and determines a numerology for the TRP, a numerology for each beam in the TRP, and a numerology for the TRP over different time domain resources and/or frequency domain resources according to the TRP-specific system information.

In the embodiments of the invention, in the operation S22, the terminal alternatively determines the numerology according to the synchronization signal, and/or the system information of the TRP group, detected in the TRP group as follows.

The terminal receives the system information of the TRP group, where the system information includes at least one of: a numerology for a sub-band corresponding to the TRP group, a numerology for a time domain resource and/or a frequency domain resource corresponding to the TRP group, a numerology for a TRP in the TRP group, or a numerology for a beam corresponding to the TRP group.

In this implementation, a third synchronization signal may not be detected, but a numerology for each TRP, each sub-band, and each beam in the TRP group can be obtained directly according to the indication of the system information of the TRP group, where if at least one TRP includes a plurality of sub-bands and/or beams, then numerologies of the TRP over each sub-band and/or each beam may be further obtained. The terminal to access, and to operate in, a TRP further detects a system bandwidth of the TRP group, or a predefined transmission resource of the third synchronization signal, or a transmission resource for a third synchronization signal, indicated in the system information of the TRP group, for the third synchronization signal, and selects a third synchronization signal with the strongest detected signal strength, and determine a TRP corresponding to the third synchronization signal as a TRP for the terminal to access; and the terminal detects a third synchronization signal by determining a numerology of each third synchronization signal according to a correspondence relationship, between a numerology and a TRP or a beam or a sub-band, and a correspondence relationship between each TRP or beam or sub-band and a third synchronization signal, indicated in the system information of the TRP group, i.e., for example, a third synchronization signal sequence A corresponds to a TRP1 and a numerology 1, a third synchronization signal sequence B corresponds to a TRP2 and a numerology 2, a third synchronization signal sequence C corresponds to a TRP3 and the numerology 1, a third synchronization signal sequence D corresponds to a TRP4 and a numerology 3, and so on, so that the terminal detects blindly the respective third synchronization signal sequences one by one, that is, the terminal attempts to detect the third synchronization signal sequence A using the numerology 1, to detect the third synchronization signal sequence B using the numerology 2, to detect the third synchronization signal sequence C using the numerology 1, to detect the third synchronization signal sequence D using the numerology 3, and so on; the terminal accesses, or resides in, a TRP or a beam or a sub-band corresponding to a third synchronization signal with the strongest detected signal strength; and the terminal can further obtain TRP-specific system information of the accessed TRP to thereby obtain more configuration information of the TRP so that data are further transmitted while being served by the TRP.

Further to any one of the embodiments above, in the embodiments of the invention, the correspondence relationship between a third synchronization signal (or a synchronization signal 3) and a sub-band or a TRP or a beam is determined in a predefined manner, or notified in the system information of the TRP group, where a plurality of third synchronization signal sequences corresponds to a same TRP or beam; and for example, a TRP includes a plurality of sub-bands, there are different numerologies of the respective sub-bands, and different third synchronization signal sequences can be transmitted in the different sub-bands, but all the sub-bands correspond to a same TRP; and in another example, a TRP includes a plurality of beams, there are different numerologies of the respective beams, and different third synchronization signal sequences can be transmitted over the different beams, but all the beams correspond to a same TRP.

Further to any one of the embodiments above, after the operation S22, the method further includes: the terminal transmits data over the TRP or the sub-band or the beam in the TRP group according to the determined numerology.

Particularly the terminal determines a TRP, a sub-band, and/or a beam for the terminal to reside in or to access, according to the detected third synchronization signal, and the terminal subsequently transmits data over the determined TRP, sub-band, and/or beam according to the numerology determined in the operation S22.

Furthermore the terminal determines precise synchronization with the TRP, the sub-band, and/or the beam for the terminal to reside in or to access, according to the third synchronization signal; and further receives TRP-specific system information (including at least one of an MIB or an SIB) transmitted by the TRP for the terminal to reside in or to access, to thereby obtain particular configuration information, e.g., a transmission bandwidth, etc., of the TRP.

Figure 2B:
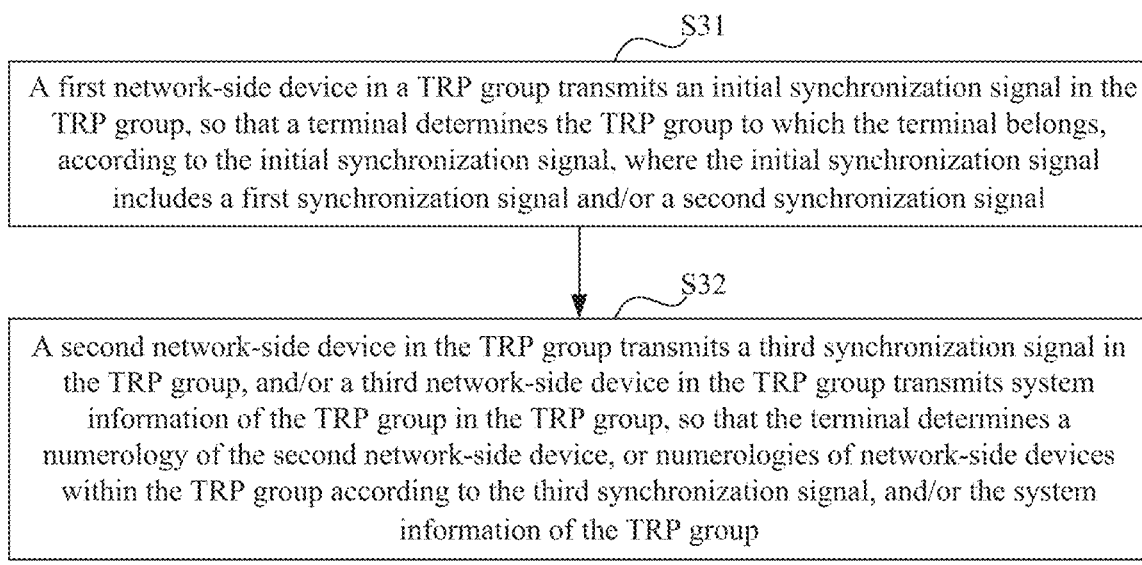
FIG. 2B is a schematic diagram of a method for determining a numerology at the network side according to the embodiments of the invention.

FIG. 2B illustrates a method for determining a numerology at a network-side according to embodiments of the invention, where the method includes the following operations: in the operation S31, a first network-side device in a TRP group transmits an initial synchronization signal in the TRP group, so that a terminal determines the TRP group to which the terminal belongs, according to the initial synchronization signal, where the initial synchronization signal includes a first synchronization signal and/or a second synchronization signal; and in the operation S32, a second network-side device in the TRP group transmits a third synchronization signal in the TRP group, and/or a third network-side device in the TRP group transmits system information of the TRP group in the TRP group, so that the terminal determines a numerology of the second network-side device, or numerologies of network-side devices within the TRP group according to the third synchronization signal, and/or the system information of the TRP group.

Particularly the terminal determines the numerology of the second network-side device according to the third synchronization signal; or determines the numerology of the second network-side device according to the third synchronization signal and the system information of the TRP group; or determines the numerologies of the network-side devices in the TRP group according to the system information of the TRP group, and the numerologies of the network-side devices determined at this time includes the numerology of the second network-side device.

Optionally the first network-side device and the second network-side device are a same network-side device in the TRP group, or different network-side devices in the TRP group; and/or the first network-side device and the third network-side device are a same network-side device in the TRP group, or different network-side devices in the TRP group.

Optionally the second network-side device and the third network-side device are a same network-side device in the TRP group, or different network-side devices in the TRP group.

Optionally the first network-side device is a TRP or a base station in the TRP group. If the first network-side device supports a plurality of beams, then the first network-side device transmits the initial synchronization signal over a part or all of the supported beams.

Optionally the second network-side device is a TRP or a base station in the TRP group. If the second network-side device supports a plurality of beams, then the second network-side device transmits the third synchronization signal over a part or all of the supported beams.

Optionally the third network-side device is a TRP or a base station in the TRP group. If the third network-side device supports a plurality of beams, then the third network-side device transmits the system information of the TRP group over a part or all of the supported beams.

Further to any one of the embodiments above, the second network-side device transmits the third synchronization signal in the TRP group in the following several possible implementations.

1. The second network-side device transmits the third synchronization signal in an operating bandwidth corresponding to the second network-side device, in a system bandwidth of the TRP group.

In this implementation, the second network-side device transmits the third synchronization signal over a specific resource in the operating bandwidth, e.g., a resource predefined between the terminal and the network-side; or transmits the third synchronization signal over any resource in the operating bandwidth, and at this time, the terminal does not know a position of the resource for transmitting the third synchronization signal, but can only detect it blindly.

2. The second network-side device transmits the third synchronization signal over a predefined transmission resource of the third synchronization signal.

3. The second network-side device transmits the third synchronization signal over a transmission resource, of the third synchronization signal, indicated in the system information of the TRP group.

Further to any one of the embodiments above, the second network-side device transmits the third synchronization signal in the TRP group in the following several possible implementations.

1. The second network-side device determines a numerology corresponding to a frequency band on which the third synchronization signal is to be transmitted, according to a correspondence relationship between a frequency band and a numerology, and transmits the third synchronization signal according to the determined numerology.

In this implementation, the numerology determined by the second network-side device is a numerology for the second network-side device to subsequently transmit data.

2. The second network-side device determines a third synchronization signal sequence corresponding to the numerology of the second network-side device, according to a correspondence relationship, between a third synchronization signal sequence and a numerology, predefined, or indicated in the system information of the TRP group, and transmits the third synchronization signal sequence corresponding to the numerology of the second network-side device according to a preset numerology, or any one of a plurality of numerologies defined in a communication system, or a numerology indicated in the system information of the TRP group, or the numerology of the second network-side device.

3. The second network-side device determines a third synchronization signal sequence corresponding to the second network-side device, according to a correspondence relationship, between a third synchronization signal sequence and a network-side device, predefined, or indicated in the system information of the TRP group, and transmits the third synchronization signal sequence corresponding to the second network-side device according to the numerology of the second network-side device.

In this implementation, one or more third synchronization signal sequences correspond to one network-side device, and this correspondence relationship is known; and when the terminal obtains a third synchronization signal sequence at a numerology as a result of blindly detecting a plurality of numerologies, it can determine a network-side device corresponding to the third synchronization signal sequence, and can further determine that the third synchronization signal is transmitted by the network-side device using the numerology corresponding to the detected third synchronization signal sequence.

In a possible implementation, the system information of the TRP group includes at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, or a numerology for each network-side device in the TRP group over different time domain and/or frequency domain resources, so that the terminal can determine a numerology of each network-side device in the TRP group according to the received system information.

In a possible implementation, the system information of the TRP group indicates a correspondence relationship between a third synchronization signal sequence and a numerology, so that the terminal can determine a numerology of each third synchronization signal sequence according to the correspondence relationship indicated in the system information of the TRP group, to thereby detect blindly the third synchronization signal using the determined numerologies.

In a possible implementation, the system information of the TRP group indicates a numerology or numerologies, so that the terminal can detect the third synchronization signal using the numerology or numerologies indicated in the system information of the TRP group.

In a possible implementation, the system information of the TRP group indicates a transmission resource of the third synchronization signal, so that the terminal can detect the transmission resource indicated in the system information of the TRP group, for the third synchronization signal.

In a possible implementation, the method further includes: the second network-side device transmits specific system information of the second network-side device according to a predefined numerology, or a numerology indicated in the system information of the TRP group, or a default numerology of the second network-side device, where the specific system information includes at least one of a numerology for the network-side device, a numerology for each beam in the network-side device, or a numerology for the network-side device over different time domain resources and/or frequency domain resources.

Further to any one of the embodiments above, in a possible implementation, the method further includes: the second network-side device or the third network-side device receives a plurality of third synchronization signal sequences reported by the terminal, selects one or more of the plurality of third synchronization signal sequences, and notifies the terminal of the selected third synchronization signal sequence(s).

Further to any one of the embodiments above, in a possible implementation, the method further includes: the second network-side device subsequently transmits data in its operating bandwidth according to its numerology.

Particularly when each network-side device in the TRP group is embodied as a TRP, the TRP operates in one or more sub-bands, and includes one or more beams.

Here subsequent transmission is data transmission after the terminal accesses the network-side device, e.g., a Physical Downlink Shared Channel (PDSCH), a Physical Downlink Control Channel (PDCCH), a Physical Uplink Shared Channel (PUSCH), a Physical Uplink Control Channel (PUCCH), a Sounding Reference Signal (SRS), etc.

A method for determining a numerology according to the embodiments of the invention will be described below in details in connection with three particular embodiments. For the sake of a convenient description, the first synchronization signal will be referred to as a synchronization signal 1, the second synchronization signal will be referred to as a synchronization signal 2, the third synchronization signal will be referred to as a synchronization signal 3, and the third synchronization signal sequence will be referred to as a synchronization signal 3 sequence in the following embodiments.

Figure 3:
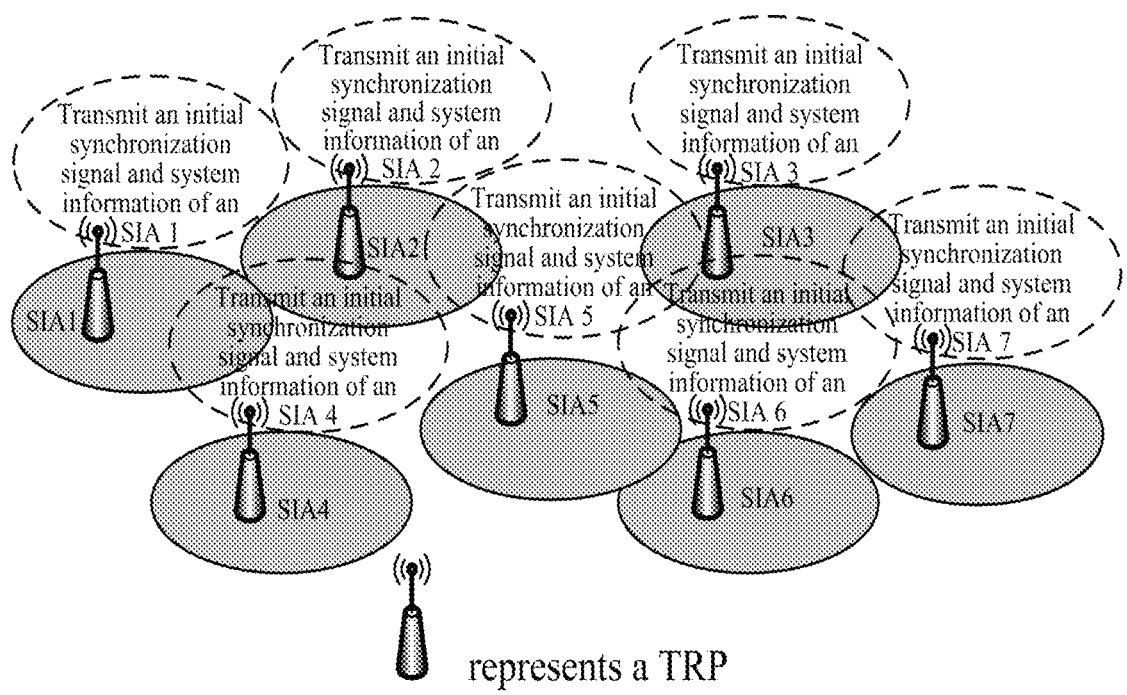
FIG. 3 is a schematic diagram of an application scenario of a first embodiment of the invention.

In a first embodiment, this embodiment is applicable to a scenario as illustrated in FIG. 3, where each System Information Area (SIA) corresponds to a TRP group, each TRP group includes only one TRP, and each TRP transmits a synchronization signal and system information separately. A terminal to access, or to reside in, any one of TRPs, firstly detects a synchronization signal 1 and a synchronization signal 2 (the synchronization signals 1 and 2 can be predefined at fixed positions in a system bandwidth, e.g., a center of the system bandwidth, so that the terminal determines frequency domain positions in the system bandwidth based upon frequency domain positions of the synchronization signals 1 and 2 after obtaining the system bandwidth; and of course, time domain transmission positions of the synchronization signals 1 and 2 can be further predefined, so that a temporal boundary, e.g., a radio frame/sub-frame/symbol boundary, can be determined after the synchronization signals 1 and 2 are detected blindly), where the terminal can detect the synchronization signal 1 and the synchronization signal 2 according to a default numerology, e.g., the default numerology including a sub-carrier spacing 15 kHz, and lengths of an OFDM symbol, a CP, a sub-frame (or a min-frame), etc., defined at the sub-carrier spacing; or the terminal can detect blindly the synchronization signal 1 and the synchronization signal 2 according to one or more numerologies supported in a communication system, and for example, firstly detect the synchronization signals 1 and 2 according to the sub-carrier spacing 15 kHz, and a corresponding parameter at the sub-carrier spacing, and then detect the synchronization signals 1 and 2 according to a sub-carrier spacing 60 kHz, and a corresponding parameter at the sub-carrier spacing, and if more numerologies are defined, then it will further proceed with the other defined numerologies, and select the synchronization signals 1 and 2 at a numerology with the highest detected strength as an access point, to thereby be initially synchronized with a TRP corresponding to the synchronization signals 1 and 2, and then read system information of the TRP.

Figure 4A:
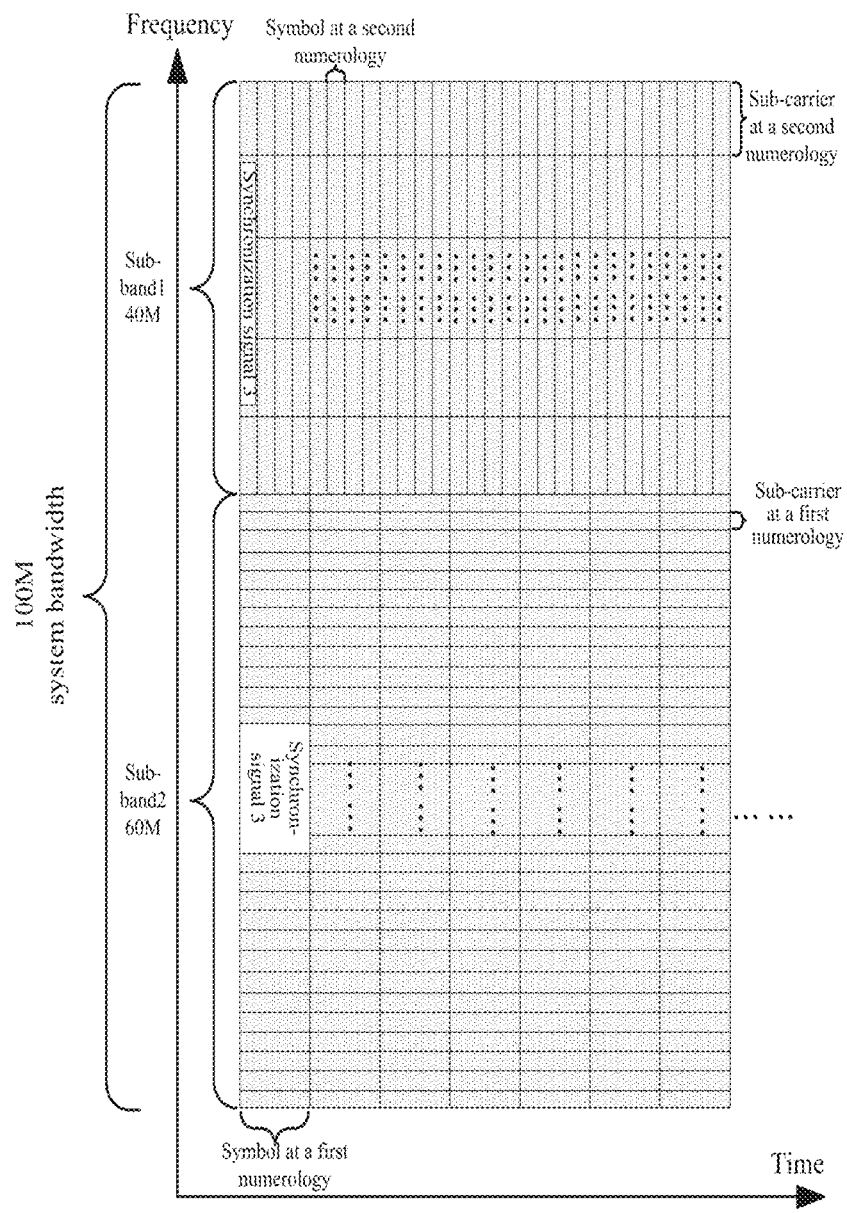
FIG. 4A and FIG. 4B are schematic diagrams of a synchronization signal 3 in the first embodiment of the invention.
Figure 4B:
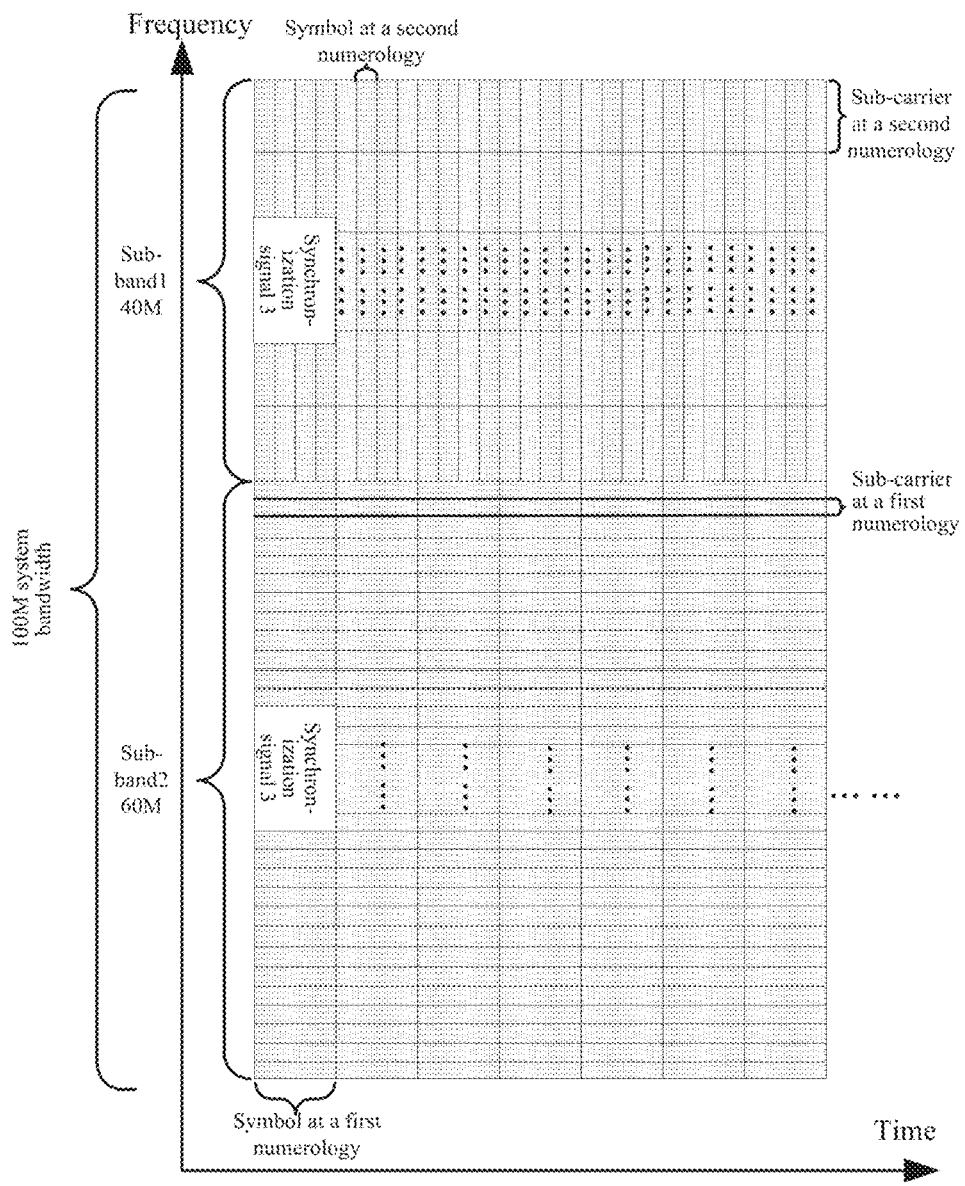

Furthermore the terminal can obtain a system bandwidth of the TRP according to the system information, and of course, the system information can further include sub-band configuration information of the system bandwidth. As illustrated in FIG. 4A and FIG. 4B, for example, the system bandwidth is 100 MHz, the system bandwidth 100 MHz is divided into two sub-bands in a TRP, and different numerologies are applicable to different sub-bands. Of course, the system bandwidth can alternatively be divided into sub-bands according to the size of the system bandwidth, and under a preset rule. Of course, a correspondence relationship between a synchronization signal 3 and a sub-band or a TRP or a beam can be further notified in the system information, or the correspondence relationship can be predefined, and for example, a sub-band including a transmission resource over which a synchronization signal 3 is detected is a sub-band corresponding to the synchronization signal 3, a synchronization signal 3 sequence is correlated with a TRP ID and/or a beam ID, etc. For example, if the synchronization signal 3 sequence is generated according to the TRP ID and/or the beam ID, then the terminal may determine the corresponding TRP ID and/or beam ID according to the detected synchronization signal 3, and alike the terminal may determine the corresponding synchronization signal 3 sequence according to the TRP ID and/or the beam ID. In another example, a correspondence relationship or a functional relationship between a synchronization signal 3 sequence and a TRP ID and/or a beam ID is predefined. The correspondence relationship or the functional relationship between a synchronization signal 3 sequence and a TRP ID and/or a beam ID will be exemplified as follows: for example, each synchronization signal 3 sequence is generated according to a TRP ID, where the synchronization signal 3 sequence=f(TRP ID), or f(TRP group ID, TRP ID), etc., or the number of the synchronization signal 3 sequence=f(TRP ID), f(TRP group ID, TRP ID), etc.; and in another example, the number of the synchronization signal 3 sequence=(TRP group ID*W+TRP ID), where W is a predefined integer.

Particularly there are the following several possible implementations.

In a first implementation, the system information indicates at least transmission resources for detecting a synchronization signal 3, e.g., a transmission resource of a synchronization signal 3 in each sub-band of a system bandwidth, or corresponding frequency domain positions (e.g., Resource Blocks (RBs) x~y) in a system bandwidth directly as transmission resources of a synchronization signal 3 when the system bandwidth is not divided into sub-bands.

In this implementation, the terminal detects over these transmission resources of a synchronization signal 3, for a synchronization signal 3 according to a default numerology, or a numerology for transmitting a synchronization signal 3, indicated in the system information, as illustrated in FIG. 4B. A correspondence relationship between different synchronization signal 3 sequences, and different numerologies for corresponding sub-bands or TRPs or beams is predefined, or further indicated in the system information, and the terminal determines a numerology corresponding to a sub-band, a TRP, and/or a beam corresponding to a synchronization signal 3 according to the synchronization signal 3 sequence detected over each transmission resource, and the correspondence relationship; or the terminal selects a synchronization signal 3 sequence with the highest detected energy or performance over a plurality of transmission resources as a detected synchronization signal 3 sequence, and determines a numerology corresponding to a sub-band, a TRP, and/or a beam corresponding to the synchronization signal 3 according to the synchronization signal 3 sequence and the correspondence relationship.

In a second implementation, the system information indicates at least transmission resources for detecting a synchronization signal 3 (particularly as described in the first implementation).

In this implementation, the terminal detects blindly these transmission resources for the synchronization signal 3 according to a plurality of preset numerologies, or a plurality of numerologies indicated in the system information, or a plurality of numerologies supported or defined in a communication system, or numerologies, corresponding to respective synchronization signals 3, determined according to a correspondence relationship, between different synchronization signal 3 sequences, and different numerologies for sub-bands or TRPs or beams, predefined, or indicated in the system information, as illustrated in FIG. 4A. For example, the terminal attempts to detect each of the transmission resources above for a synchronization signal 3 using the respective numerologies above respectively, and selects a synchronization signal 3 sequence with the highest detected energy or performance among the numerologies as a synchronization signal 3 sequence detected over the transmission resource, and the terminal can determine a numerology for the detected synchronization signal 3 sequence as a numerology for a sub-band, a TRP, and/or a beam corresponding to the synchronization signal 3; or the terminal selects a synchronization signal 3 sequence with the highest detected energy or performance over the transmission resources as a detected synchronization signal 3 sequence, and determines a numerology for the synchronization signal 3 sequence as a numerology for a sub-band, a TRP, and/or a beam corresponding to the synchronization signal 3.

In a third implementation, the system information indicates at least a numerology for a sub-band, a TRP, and/or a beam corresponding to the synchronization signal 3 of the TRP group, and a numerology for transmitting a synchronization signal 3 in the TRP group.

Particularly if the system information indicates one numerology, then there will be the same numerology of all the sub-bands by default, so a synchronization signal 3 is only detected to determine a sub-band or a beam for the terminal to access; and if the system information indicates a plurality of numerologies, then a synchronization signal 3 is detected blindly using the different numerologies.

In this implementation, the terminal detects blindly a system bandwidth of the TRP group, or a predefined transmission resource of a synchronization signal 3 (e.g., a same resource position as a synchronization signal 1 and/or a synchronization signal 2, or of course, a different resource position from a synchronization signal 1 and/or a synchronization signal 2, for example, a synchronization signal 1 and/or a synchronization signal 2 can occupy an RB x1~y1 in the system bandwidth, and a synchronization signal 3 occupies an RB x2~y2 in the system bandwidth, which will apply hereinafter), for a synchronization signal 3 according to the numerology or numerologies above; and for example, the system bandwidth is scanned, or a plurality of preset resource positions are detected, for a plurality of synchronization signals 3 satisfying a preset threshold, or the system bandwidth is scanned, or one or more preset resources is or are detected, for a synchronization signal 3 sequence with the highest energy or performance, and a numerology for the detected synchronization signal 3 sequence is determined as a numerology of a sub-band, a TRP, and/or a beam corresponding to the synchronization signal 3.

In a fourth implementation, the system information indicates at least a numerology for transmitting a synchronization signal 3 in the TRP group.

Particularly if the system information indicates one numerology, then a same numerology will be applicable to all the transmission instances by default, and the synchronization signal 3 will be only detected to determine a sub-band, a TRP, and/or a beam for the terminal to access; and if the system information indicates a plurality of numerologies, then a synchronization signal 3 will be detected blindly using the different numerologies.

In this implementation, the terminal detects blindly a system bandwidth of the TRP group, or a predefined transmission resource of a synchronization signal 3, for a synchronization signal 3 according to the numerology or numerologies above; and a correspondence relationship between different synchronization signal 3 sequences, and different numerologies for sub-bands or TRPs or beams is predefined, or further indicated in the system information, and for example, the system bandwidth is scanned, or a plurality of preset resources are detected, for a plurality of synchronization signal 3 sequences satisfying a threshold, or the system bandwidth is scanned, or one or more preset resources are detected, for a synchronization signal 3 sequence with the highest energy or performance, and the terminal determines a numerology of a sub-band, a TRP, and/or a beam corresponding to the detected synchronization signal 3 according to the detected synchronization signal 3 sequence and the correspondence relationship.

In a fifth implementation, the system information indicates at least a correspondence relationship between different synchronization signal 3 sequences, and different numerologies for sub-bands or TRPs or beams.

In this implementation, the terminal detects a system bandwidth of the TRP group, or a predefined transmission resource of a synchronization signal 3, for a synchronization signal 3 sequence, according to one or more preset numerologies, or one or more numerologies indicated in the system information, or a plurality of numerologies defined or supported in a communication system, or numerologies of different detected synchronization signal 3 sequences determined according to the correspondence relationship.

Here if there are a plurality of numerologies, then the terminal will detect blindly a synchronization signal 3 according to the respective numerologies; and for example, the system bandwidth is scanned, or a plurality of preset resources are detected, for a plurality of synchronization signals 3 satisfying a preset threshold, or the system bandwidth is scanned, or one or more preset resources is or are detected, for a synchronization signal 3 sequence with the highest energy or performance, and the terminal determines a numerology of a sub-band, a TRP, and/or a beam corresponding to the synchronization signal 3 according to the detected synchronization signal 3 sequence and the correspondence relationship.

In a sixth implementation, the terminal detects a system bandwidth of the TRP group, or a predefined transmission resource of a synchronization signal 3, for a synchronization signal 3 sequence according to one or more preset numerologies, or a plurality of numerologies defined or supported in a communication system.

Here if there are a plurality of numerologies, then the terminal will detect blindly a synchronization signal 3 according to the respective numerologies; and for example, the system bandwidth is scanned, or a plurality of preset resources are detected, for a plurality of synchronization signals 3 satisfying a preset threshold, or the system bandwidth is scanned, or one or more preset resources is or are detected, for a synchronization signal 3 sequence with the highest energy or performance, and the terminal determines a numerology for the detected synchronization signal 3 as a numerology of a sub-band, a TRP, and/or a beam corresponding to the synchronization signal 3.

In a seventh implementation, a correspondence relationship between different synchronization signal 3 sequences, and different numerologies for sub-bands or TRPs or beams is predefined.

In this implementation, the terminal detects a system bandwidth of the TRP group, or a predefined transmission resource of a synchronization signal 3, for a synchronization signal 3 sequence, according to one preset numerology, or numerologies corresponding to respective synchronization signal 3 sequences determined according to the above correspondence relationship; and for example, the system bandwidth is scanned, or a plurality of preset resources are detected, for a plurality of synchronization signal 3 sequences satisfying a preset threshold, or the system bandwidth is scanned, or one or more preset resources is or are detected, for a synchronization signal 3 sequence with the highest energy or performance, and the terminal determines a numerology of a sub-band, a TRP, and/or a beam corresponding to the synchronization signal 3 according to the detected synchronization signal 3 sequence and the above correspondence relationship.

In the first, fourth, fifth, and seventh implementations above, for example, it is predefined, or indicated in the system information, that synchronization signal 3 sequences 0~A correspond to a first numerology, synchronization signal 3 sequences A+1~B correspond to a second numerology, and so on. If the correspondence relationship is predefined, then the same number of correspondence relationships as the number of numerologies will be defined in the communication system; and if the correspondence relationship is indicated in the system information, then the terminal may be notified of a correspondence relationship between the respective numerologies defined in the communication system, and synchronization signals 3, or only a correspondence relationship between a numerology or numerologies supported in the TRP group (one or more numerologies), and a synchronization signal 3. If a synchronization signal 3 sequence detected by the terminal over a transmission resource 1 (corresponding to a sub-band 1) is one of the synchronization signal 3 sequences 0-A, then a numerology of the sub-band 1 will be determined as the first numerology; and if a synchronization signal 3 sequence detected by the terminal over a transmission resource 2 (corresponding to a sub-band 2) is one of the synchronization signal 3 sequences A+1-13, then a numerology of the sub-band 2 will be determined as the second numerology, and at this time, the terminal can operate in the sub-band 1 and the sub-band 2 of the TRP concurrently or in a TDM mode; or if the synchronization signal 3 sequence detected by the terminal over the transmission resource 2 has the highest energy, then a numerology of the sub-band 2 will be determined as the second numerology, and the terminal will only operate in the sub-band 2 of the TRP.

Here the number of blind detections in the fourth, fifth, or seventh implementation is more than that in the first implementation, that is, if there are N synchronization signal 3 sequences in the system, then only N blind detections will be performed in the first implementation; N*M blind detections will be performed in the fourth implementation, where M is the number of numerologies; a transmission resource of a synchronization signal 3 will be further detected blindly in the fifth implementation; and although a synchronization signal 3 will not be detected blindly using any numerology in the seventh implementation, a transmission resource will be detected blindly. An advantage of the fourth, fifth, and seventh implementations is that no correspondence relationship between a synchronization signal 3 and a numerology is predefined or notified, and an advantage of the seventh implementation is that no information about a synchronization signal 3 is configured in the system information.

In the second, third, and sixth implementations, for example, if the terminal detects the transmission resource 1 for a synchronization signal 3 using the first numerology, then it will determine that the first numerology is applicable to the first sub-band 1, and if the terminal detects the transmission resource 2 for a synchronization signal 3 using the second numerology, then it will determine that the second numerology is applicable to the second sub-band 2, and the terminal may operate in the sub-band 1 and the sub-band 2 of the TRP concurrently or in a TDM mode, or if the synchronization signal 3 sequence detected by the terminal over the transmission resource 2 has the highest energy, then the terminal will determine the numerology of the sub-band 2 as the second numerology, and the terminal will only operate in the sub-band 2 of the TRP.

Here the number of blind detections in the second, third, or sixth implementation is more than that in the first implementation, that is, if there are N synchronization signal 3 sequences in the system, then only N blind detections will be performed in the first implementation; N*M blind detections will be performed in the second, third, and sixth implementations, where M is the number of numerologies; a transmission resource of a synchronization signal 3 will be further detected blindly in the third and sixth implementations. An advantage of the second, third, and sixth implementations is that no correspondence relationship between a synchronization signal 3 and a numerology is predefined or notified, and an advantage of the sixth implementation is that no information about a synchronization signal 3 is configured in the system information.

In the third, fourth, and fifth implementations above, when the particular position of a synchronization signal in the system bandwidth is unknown, a transmission resource thereof is determined through blind detections, so the system bandwidth can be detected for a synchronization signal 3, in each time domain unit, or the system bandwidth can be detected for a synchronization signal 3 in a predefined part of time domain units.

In the sixth and seventh implementations above, no information about a synchronization signal 3 is notified in the system information, but blind detections are performed directly, so the system information is only received to obtain the system bandwidth, the SFN, and other parameters, and if a synchronization signal 3 is detected without these parameters, then a synchronization signal 3 may be detected directly without firstly receiving the system information.

Moreover in this scenario, since a TRP is a TRP group, the system information broadcasted by the TRP can include numerologies of the TRP over respective sub-bands or bandwidth parts or beams in the system bandwidth, so the numerologies will not be obtained by detecting a synchronization signal 3.

Figure 5:
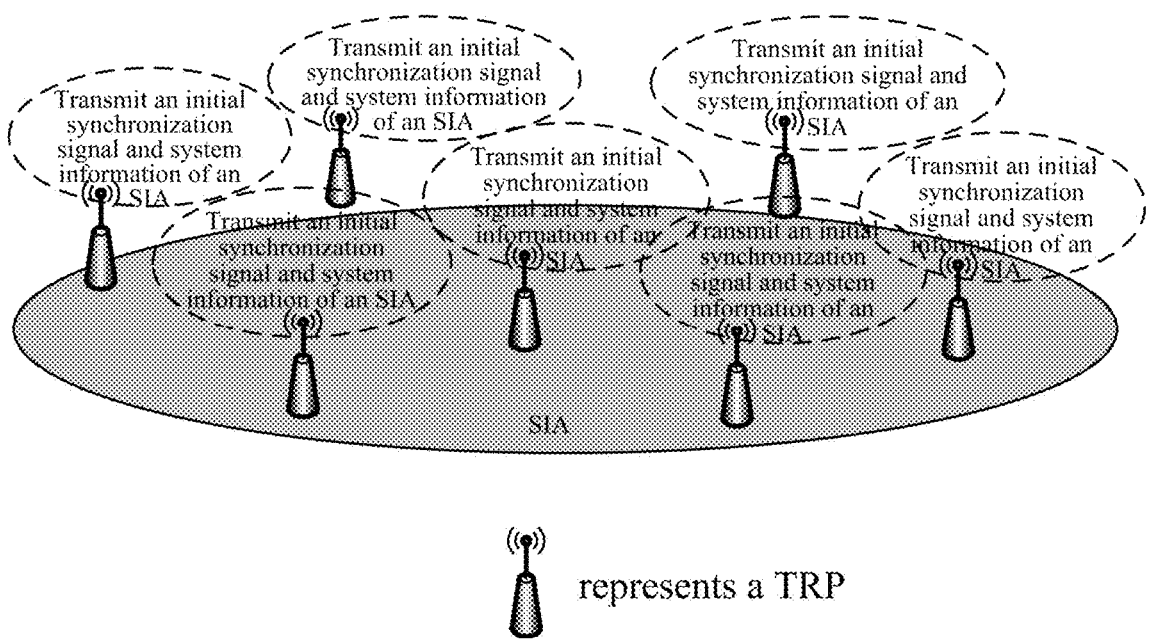
FIG. 5 is a schematic diagram of an application scenario of a second embodiment of the invention.

In a second embodiment, this embodiment is applicable to a scenario as illustrated in FIG. 5, where an SIA corresponds to a TRP group, each TRP group includes a plurality of TRPs, the plurality of TRPs may or may not be synchronous with each other, and a part or all of the TRPs transmit a same initial synchronization signal and system information. A terminal to access, or to reside in, the TRP group, firstly detects a synchronization signal 1 and a synchronization signal 2 particularly as described in the first embodiment (a repeated description thereof will be omitted here), is synchronized with a TRP group, and then reads system information of the TRP group.

Figure 6A:
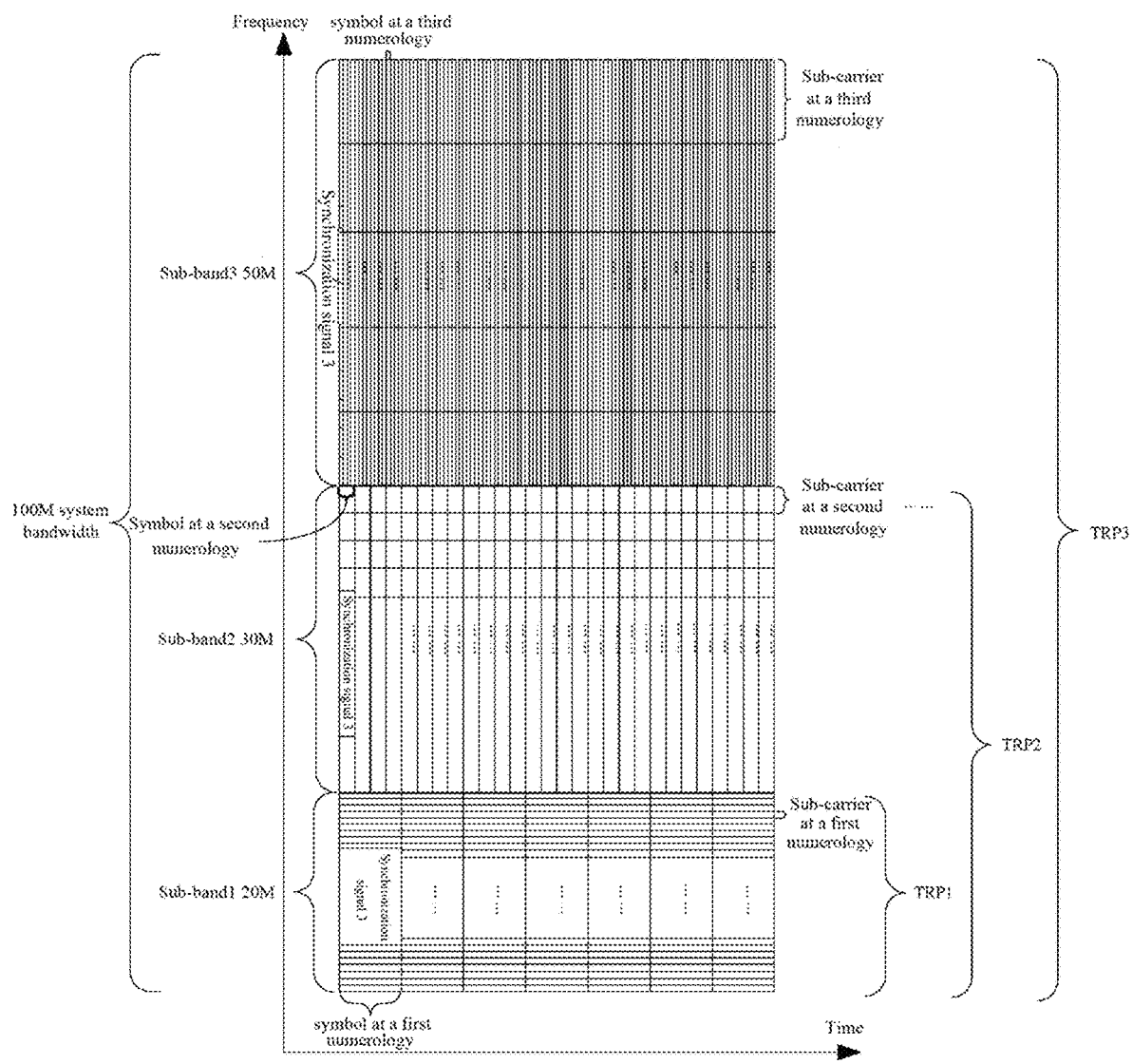
FIG. 6A and FIG. 6B are schematic diagrams of a synchronization signal 3 in the second embodiment of the invention.
Figure 6B:
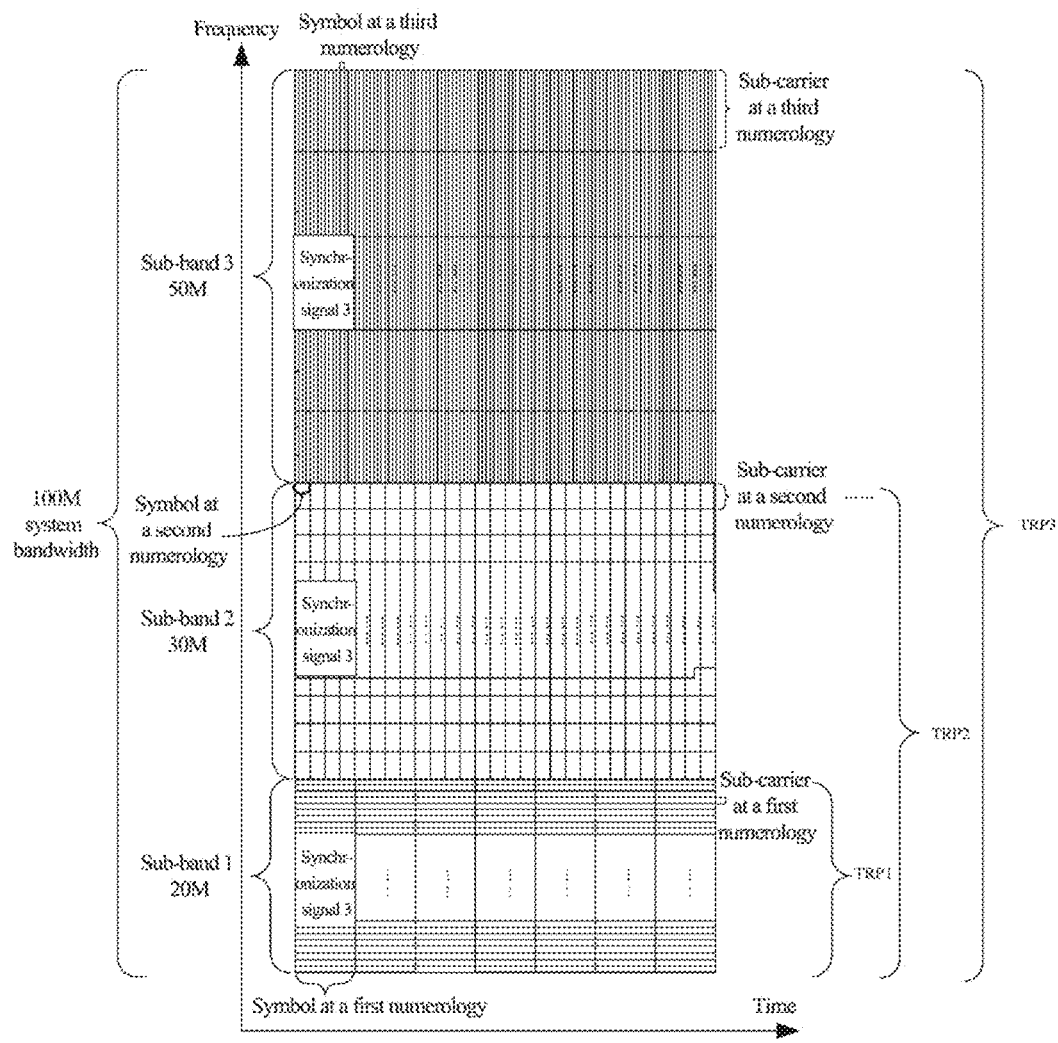

Furthermore the terminal can obtain a system bandwidth of the TRP according to the system information, and of course, the system information can further include sub-band configuration information of the system bandwidth. As illustrated in FIG. 6A and FIG. 6B, for example, the system bandwidth is 100 MHz, the system bandwidth 100 MHz is divided into three sub-bands, and different numerologies are applicable to different sub-bands. Of course, the system bandwidth can alternatively be divided into sub-bands according to the size of the system bandwidth, and under a preset rule. Of course, a correspondence relationship between a synchronization signal 3 and a sub-band/TRP/beam can be further indicated in the system information, or the correspondence relationship can be predefined, and for example, a sub-band including a transmission resource over which a synchronization signal 3 is detected is a sub-band corresponding to the synchronization signal 3, a synchronization signal 3 sequence is correlated with a TRP ID and/or a beam ID, etc. Particularly there are the following three possible implementations.

First to seven implementations are the same as in the first embodiment except for the following difference.

In the first, fourth, fifth, and seventh implementations above, for example, it is predefined, or indicated in the system information, that synchronization signal 3 sequences 0~A correspond to a first numerology, synchronization signal 3 sequences A+1~B correspond to a second numerology, synchronization signal 3 sequences B+1~C correspond to a third numerology, and so on. If the correspondence relationship is predefined, then the same number of correspondence relationships as the number of numerologies will be defined in the communication system; and if the correspondence relationship is notified in the system information, then the terminal may be notified of a correspondence relationship between the respective numerologies defined in the communication system, and different synchronization signal 3 sequences, or only a correspondence relationship between a numerology or numerologies supported in the TRP group (one or more numerologies), and different synchronization signal 3 sequences.

By way of an example, if a synchronization signal 3 sequence detected by a terminal 1 over only a transmission resource 1 (corresponding to a sub-band 1) is a sequence X1 between the synchronization signal 3 sequences 0~A, and the sequence X1 corresponds to a TRP1 (the correspondence relationship is predefined, or calculated according to a functional relationship, which will apply hereinafter), then the terminal 1 will belong to the TRP1, and determine a numerology of the TRP1 in the sub-band 1 as the first numerology.

If a synchronization signal 3 sequence detected by a terminal 2 over the transmission resource 1 is a sequence X2 between the synchronization signal 3 sequences 0~A, a synchronization signal 3 sequence detected by the terminal 2 over a transmission resource 2 (corresponding to a sub-band 2) is a sequence X3 between the synchronization signal 3 sequences A+1~B, and both the sequence X2 and the sequence X3 correspond to a TRP2, then the terminal 2 will belong to the TRP2, and determine a numerology of the TRP2 in the sub-band 1 as the first numerology, and a numerology of the TRP2 in the second sub-band 2 as the second numerology, and at this time, the terminal 2 can at least operate in the sub-band 1 and the sub-band 2 of the TRP2 concurrently or in a TDM mode, or if the terminal 2 compares detected energies over the transmission resource 1 and the transmission resource 2, and then determines that the energy of the synchronization signal 3 sequence X3 detected over the transmission resource 2 is higher, then alike the terminal 2 may belong to the TRP2, and determine a numerology of the TRP2 in the sub-band 2 as the second numerology, as defined above, but since the terminal 2 can not determine whether the TRP2 further includes another sub-band(s) (e.g., the sub-band 1) and numerology or numerologies, it can only operate in the sub-band 2 according to the second numerology right after it accesses the TRP2, until it receives a further configuration or instruction of the TRP2, e.g., TRP-specific system information or configuration information transmitted by the TRP2 to notify the terminal of a particular operating bandwidth, numerology, and other information in the TRP2.

If a synchronization signal 3 sequence detected by a terminal 3 over the transmission resource 1 is a sequence X4 between the synchronization signal 3 sequences 0~A, a synchronization signal 3 sequence detected by the terminal 3 over the transmission resource 2 is a sequence X5 between the synchronization signal 3 sequences A+1~B, a synchronization signal 3 sequence detected by the terminal 3 over a transmission resource 3 (corresponding to a sub-band 3) is a sequence X6 between the synchronization signal 3 sequences B+1~C, and all of the sequences X4, X5, and X6 correspond to a TRP3, then the terminal 3 will belong to the TRP3, and determine a numerology of the TRP3 in the sub-band 1 as the first numerology, a numerology of the TRP3 in the sub-band 2 as the second numerology, and a numerology of the TRP3 in the sub-band 3 as the third numerology, and at this time, the terminal 3 can at least operate in the sub-band 1, the sub-band 2, and the sub-band 3 of the TRP3 concurrently or in a TDM mode; or if the terminal 3 compares detected energies over the transmission resources 1, 2, and 3, and then determines that the energy of the synchronization signal 3 sequence X6 detected over the transmission resource 3 is the highest, then alike the terminal 3 may belong to the TRP3, and determine a numerology of the TRP3 in the sub-band 3 as the third numerology, as defined above; but since the terminal 3 can not determine whether the TRP3 further includes another sub-band(s) (e.g., the sub-bands 1 and 2) and numerology or numerologies, it can only operate in the sub-band 3 according to the third numerology right after it accesses the TRP3, until it receives a further configuration or instruction of the TRP3, e.g., TRP-specific system information or configuration information transmitted by the TRP3 to notify the terminal of a particular operating bandwidth, numerology, and other information in the TRP3.

In the second, third, and sixth implementations above, by way of an example, if a terminal 1 only detects a synchronization signal 3 sequence X1 over a transmission resource 1 using the first numerology, and the sequence X1 corresponds to the TRP1, then the terminal 1 will belong to the TRP1, and determine a numerology of the TRP1 in the sub-band 1 as the first numerology.

If a terminal 2 detects a synchronization signal 3 sequence X2 over the transmission resource 1 using the first numerology, and a synchronization signal 3 sequence X3 over a transmission resource 2 using the second numerology, and both the sequence X2 and the sequence X3 correspond to a TRP2, then the terminal 2 will belong to the TRP2, and determine a numerology of the TRP2 in the sub-band 1 as the first numerology, and a numerology of the TRP2 in the second sub-band 2 as the second numerology, and at this time, the terminal 2 can at least operate in the sub-band 1 and the sub-band 2 of the TRP2 concurrently or in a TDM mode; or if the terminal 2 compares detected energies over the transmission resource 1 and the transmission resource 2, and then determines that the energy of the synchronization signal 3 sequence X3 detected over the transmission resource 2 is higher, then alike the terminal 2 may belong to the TRP2, and determine a numerology of the TRP2 in the sub-band 2 as the second numerology, as defined above; but since the terminal 2 can not determine whether the TRP2 further includes another sub-band(s) (e.g., the sub-band 1) and numerology or numerologies, it can only operate in the sub-band 2 according to the second numerology right after it accesses the TRP2, until it receives a further configuration or instruction of the TRP2.

If a terminal 3 detects a synchronization signal 3 sequence X4 over the transmission resource 1 using the first numerology, a synchronization signal 3 sequence X5 over the transmission resource 2 using the second numerology, and a synchronization signal 3 sequence X5 over a transmission resource 3 using the second numerology, and all of the sequences X4, X5, and X6 correspond to a TRP3, then the terminal 3 will belong to the TRP3, and determine a numerology of the TRP3 in the sub-band 1 as the first numerology, a numerology of the TRP3 in the sub-band 2 as the second numerology, and a numerology of the TRP3 in the sub-band 3 as the third numerology, and at this time, the terminal 3 can at least operate in the sub-band 1, the sub-band 2, and the sub-band 3 of the TRP3 concurrently or in a TDM mode; or if the terminal 3 compares detected energies over the transmission resources 1, 2, and 3, and then determines that the energy of the synchronization signal 3 sequence X6 detected over the transmission resource 3 is the highest, then alike the terminal 3 may belong to the TRP3, and determine a numerology of the TRP3 in the sub-band 3 as the third numerology, as defined above; but since the terminal 3 can not determine whether the TRP3 further includes another sub-band(s) (e.g., the sub-bands 1 and 2) and numerology or numerologies, it can only operate in the sub-band 3 according to the third numerology right after it accesses the TRP3, until it receives a further configuration or instruction of the TRP3.

In an eighth implementation, the terminal firstly detects a synchronization signal 3, and then receives TRP-specific system information, and obtains a numerology.

Particularly the terminal detects a system bandwidth of the TRP group, or a predefined transmission resource of a synchronization signal 3, or a transmission resource of a synchronization signal indicated in the system information, for a synchronization signal 3, according to a preset numerology, or a numerology notified in the system information, or a numerology supported in a communication system, to thereby reside in or access a TRP corresponding to the synchronization signal 3. Preferably a synchronization signal 3 shall be detected using only one default numerology.

Furthermore the terminal receives TRP-specific system information transmitted by the TRP according to a preset numerology, or a numerology indicated in the system information, and determines a numerology of the TRP, or numerologies of respective beams in the TRP, or the TRP over different time domain resources and frequency domain resources according to the indication of the TRP-specific system information.

By way of an example, if a terminal 1 only detects a synchronization signal 3 sequence X1 over a transmission resource 1 under a highest-detected-energy principle, and the sequence X1 corresponds to a TRP1, then the terminal 1 will belong to the TRP1, and furthermore the terminal 1 will receive TRP-specific system information transmitted by the TRP1, and obtain sub-bands in which the TRP1 operates, and numerologies of the respective sub-bands from the TRP-specific system information, that is, the TRP1 only operates in a sub-band 1 using the first numerology.

If a terminal 2 only detects a synchronization signal 3 sequence X3 over a transmission resource 2 under the highest-detected-energy principle, and the sequence X3 corresponds to a TRP2, then the terminal 2 will belong to the TRP2, and furthermore the terminal 2 will receive TRP-specific system information transmitted by the TRP2, and obtain sub-bands in which the TRP2 operates, and numerologies of the respective sub-bands from the TRP-specific system information, that is, the TRP2 operates in a sub-band 1 using the first numerology, and a sub-band 2 using the second numerology.

If a terminal 3 only detects a synchronization signal 3 sequence X6 over a transmission resource 3 under the highest-detected-energy principle, and the sequence X6 corresponds to a TRP3, then the terminal 3 will belong to the TRP3, and furthermore the terminal 3 will receive TRP-specific system information transmitted by the TRP3, and obtain sub-bands in which the TRP3 operates, and numerologies of the respective sub-bands from the TRP-specific system information, that is, the TRP2 operates in a sub-band 1 using the first numerology, a sub-band 2 using the second numerology, and a sub-band 3 using the third numerology.

It shall be noted that a TRP or a sub-band is identified as described in these embodiments only by way of an example, but the description will equally apply to a beam instead of a TRP or a sub-band, so a repeated description thereof will be omitted here.

Furthermore in these embodiments, if all the TRPs in the TRP group are synchronous, then the terminal may detect a synchronization signal 3, receive TRP-specific system information, etc., directly based upon a synchronization condition of the synchronization signals 1 and 2, and of course, it can also make further precise synchronization adjustment using the synchronization signal 3; and if the TRPs in the TRP group are not synchronous, then the synchronization signals 1 and 2 detected by the terminal may come from a TRP which is not synchronous with a TRP from which the detected synchronization signal 3 comes, and at this time, the terminal needs to detect blindly a timing relationship when it detects a synchronization signal 3, that is, it can be synchronized with some TRP in the downlink using the synchronization signal 3, and then access the TRP and further transmit data.

Figure 7:
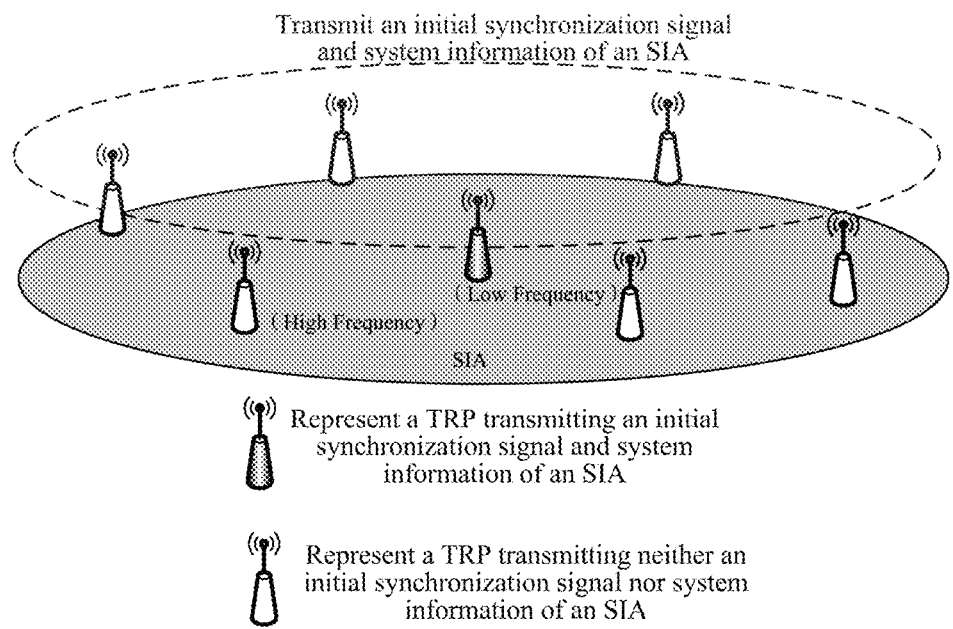
FIG. 7 is a schematic diagram of an application scenario of a third embodiment of the invention.

In a third embodiment, this embodiment is applicable to a scenario as illustrated in FIG. 7, where an SIA corresponds to a TRP group, each TRP group includes a plurality of TRPs, the plurality of TRPs may or may not be synchronous with each other, a part of the TRPs operate in a high frequency band, and the other TRPs operate in a low frequency band. Initial synchronization signals (synchronization signals 1 and 2) and the system information are transmitted on a part or all of the TRPs in only one of the frequency bands, or in a part or all of the TRPs in both of the low and high frequency bands, and the transmitting TRPs transmit the same initial synchronization signals and system information; or the system information broadcasted by TRPs in some frequency band can include only information about the frequency band, or can include both information about the frequency band, and information about another frequency band.

The terminal to access, or to reside in, a TRP group, firstly detects a synchronization signal 1 and a synchronization signal 2. It can detect them according to a default numerology, and for example, the default numerology is a sub-carrier spacing 15 kHz, and a length of an OFDM symbol, a CP, a sub-frame (or a min-frame), etc., defined at the sub-carrier spacing; or it can detect blindly them according to a plurality of numerologies supported in a communication system, and for example, it can firstly detect a synchronization signal 1 and a synchronization signal 2 according to a sub-carrier spacing 15 kHz, and a corresponding parameter at the sub-carrier spacing, and then detect a synchronization signal 1 and a synchronization signal 2 according to a sub-carrier spacing 60 kHz, and a corresponding parameter at the sub-carrier spacing, and if more numerologies are defined, then the terminal will further proceed with the other numerologies, and select a synchronization signal 1 and a synchronization signal 2 at a numerology with the highest detected strength as an access point, so that it is initially synchronized with a TRP group corresponding to the synchronization signals 1 and 2, and then reads system information of the TRP group, where the synchronization signals 1 and 2 can be predefined at fixed positions in a system bandwidth, e.g., a center of the system bandwidth, so that the terminal determines the frequency domain positions in the system bandwidth based upon the frequency domain positions of the synchronization signals 1 and 2 after obtaining the system bandwidth; and of course, transmission time domain positions of the synchronization signals 1 and 2 can be further predefined, so that a temporal boundary, e.g., a radio frame/sub-frame/symbol boundary, can be determined when the synchronization signals are detected blindly.

In this embodiment, the terminal needs to detect the two frequency bands for an initial synchronization signal.

For example, the terminal can always detect firstly the low frequency band for initial synchronization signals by default, and if the initial synchronization signals are detected, then it will be synchronized with the low frequency band, and then receive the system information in the TRP group in the low frequency band. The system information can include only configuration information of the low frequency band, e.g., information about detecting a synchronization signal 3, etc., and the terminal can determine a TRP to which the terminal belongs, and a numerology thereof in the low frequency band as described in the second embodiment 2; or the system information can include both configuration information of the low frequency band, and configuration information of the high frequency band, so that the terminal can determine a TRP to which the terminal belongs, and a numerology thereof in the low and high frequency bands as described in the second embodiment 2. If the terminal detects no initial synchronization signals in the low frequency band, then it will detect initial synchronization signals in the high frequency band, be synchronized with the high frequency band, and then receive the system information in the TRP group in the high frequency band. The system information can include only configuration information of the high frequency band, e.g., information about detecting a synchronization signal 3, etc., and the terminal can determine a TRP to which the terminal belongs, and a numerology thereof in the high frequency band as described in the second embodiment 2; or the system information can include both configuration information of the low frequency band, and configuration information of the high frequency band, so that the terminal can determine a TRP to which the terminal belongs, and a numerology thereof in the low and high frequency bands as described in the second embodiment 2.

In another example, the terminal can detect initial synchronization signals in the low and high frequency bands, select and be synchronized with the frequency band with the strongest signals, and then receive the system information in the TRP group in the frequency band, where the system information can include only configuration information of one of the frequency bands, e.g., information about detecting a synchronization signal 3, etc., and the terminal can determine a TRP to which the terminal belongs, and a numerology thereof in the frequency band as described in the second embodiment 2; or the system information can include both configuration information of the low frequency band, and configuration information of the high frequency band, so that the terminal can determine a TRP to which the terminal belongs, and a numerology thereof in the low and high frequency bands as described in the second embodiment 2.

In still another example, for a terminal supporting only some frequency band, the terminal can detect initial synchronization signals only in the supported frequency band, be synchronized in the downlink, and then receive system information transmitted in the frequency band, and the terminal can determine a TRP to include the terminal, and a numerology thereof in the frequency band as described in the second embodiment 2.

The processing flows of the methods above can be performed in software program, the software program can be stored in a storage medium, and when the stored software program is invoked, it can perform the operations in the methods above.

Based upon the same inventive idea, an embodiment of the invention further provides a terminal, and since the terminal addresses the problem under a similar principle to the method according to the embodiment as illustrated in FIG. 2A above, reference can be made to the related description in the implementation of the method for an implementation of the terminal, and a repeated description thereof will be omitted here.

Figure 8:
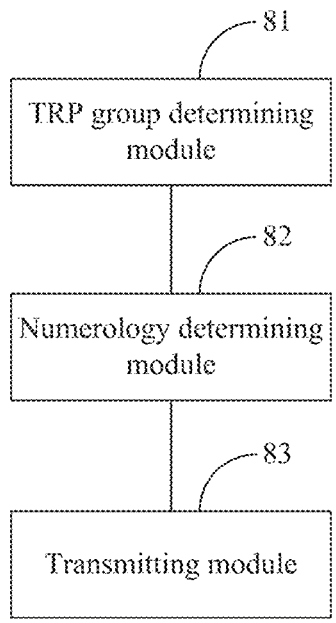
FIG. 8 is a schematic diagram of a terminal according to the embodiments of the invention.

FIG. 8 illustrates a terminal according to an embodiment of the invention, where the terminal includes: a Transmission and Reception Point (TRP) group determining module 81 is configured to determine a TRP group to which the terminal belongs according to a detected initial synchronization signal, where the initial synchronization signal includes a first synchronization signal and/or a second synchronization signal; and a numerology determining module 82 is configured to determine a numerology according to a third synchronization signal detected in the TRP group, and/or system information of the TRP group.

In a possible implementation, the numerology determining module 82 is further configured to: detect the third synchronization signal on a system bandwidth of the TRP group; or detect the third synchronization signal on a predefined transmission resource of a third synchronization signal; or detect the third synchronization signal on a transmission resource of the third synchronization signal, indicated in the system information of the TRP group.

In a possible implementation, the numerology determining module 82 is further configured to: detect the third synchronization signal according to a preset numerology; or determine a numerology corresponding to a frequency band on which the third synchronization signal is to be detected, according to a correspondence relationship between a frequency band and a numerology, and detect the third synchronization signal according to the determined numerology; or detect the third synchronization signal according to numerologies supported in a communication system; or detect the third synchronization signal according to a numerology indicated in the system information of the TRP group; or determine, according to a predefined correspondence relationship between third synchronization signal sequences, and numerologies for sub-bands or TRPs or beams, a numerology of each third synchronization signal sequence and detect the third synchronization signal according to the determined numerology; or determine, according to a correspondence relationship, between third synchronization signal sequences, and numerologies for sub-bands or TRPs or beams, indicated in the system information of the TRP group, a numerology of each third synchronization signal sequence; and detect the third synchronization signal according to the determined numerology.

In a possible implementation, the numerology determining module 82 is configured to: determine a numerology used by the detected third synchronization signal as a numerology for a sub-band, a TRP, and/or a beam corresponding to the third synchronization signal; or determine a numerology for a sub-band, a TRP, and/or a beam corresponding to the detected third synchronization signal sequence according to a predefined correspondence relationship between a third synchronization signal sequence, and a numerology for a sub-band or a TRP or a beam; or receive TRP-specific system information transmitted by a TRP corresponding to the detected third synchronization signal according to a preset numerology, and determine the numerology according to the TRP-specific system information; or determine a numerology for a sub-band, a TRP, and/or a beam corresponding to a detected third synchronization signal sequence according to a correspondence relationship, between a third synchronization signal sequence, and a numerology for a sub-band or a TRP or a beam, indicated in the system information of the TRP group; or receive TRP-specific system information transmitted by a TRP corresponding to the detected third synchronization signal according to a numerology indicated in the system information of the TRP group, and determine the numerology according to the TRP-specific system information; where the TRP-specific system information includes at least one of: a numerology for the TRP, a numerology for each beam in the TRP, or a numerology for the TRP over different time domain resources and/or frequency domain resources.

In a possible implementation, when the number of detected third synchronization signal sequences is at least two, then the numerology determining module 82 is configured to: determine a numerology for a sub-band, a TRP, and/or a beam corresponding to each third synchronization sequence; or select at least one of the at least two third synchronization signal sequences, and determine a numerology for a sub-band, a TRP, and/or a beam corresponding to the selected third synchronization signal sequence.

In a possible implementation, the numerology determining module 82 is configured to: to select the at least one of the at least two third synchronization signal sequences according to received energies, signal strengths, and/or received qualities of the at least two third synchronization signal sequences; or to report the at least two third synchronization signal sequences to a network-side, and receive the at least one of the at least two third synchronization signal sequences notified by the network-side.

In a possible implementation, the numerology determining module 82 is configured: to receive the system information of the TRP group, where the system information of the TRP group includes at least one of: a numerology for a sub-band corresponding to the TRP group, a numerology for a time domain resource and/or a frequency domain resource corresponding to the TRP group, a numerology for TRPs in the TRP group, or a numerology for a beam corresponding to the TRP group.

In a possible implementation, the transmission resources is a time domain resource and/or a frequency domain resource occupied by the third synchronization signal, or a time domain window and/or a frequency domain window for detecting the third synchronization signal.

Furthermore when the transmission resource is the time domain resource and/or the frequency domain resource occupied by the third synchronization signal, then the numerology determining module is configured to detect the third synchronization signal according to a synchronization relationship, between the terminal and the TRP group, determined based upon the initial synchronization signal; and when the transmission resources is the time domain window and/or the frequency domain window for detecting the third synchronization signal, then the numerology determining module is configured to detect blindly within the time domain window and/or the frequency domain window for the third synchronization signal, and to obtain a synchronization relationship between the terminal, and a sub-band or a TRP or a beam corresponding to the time domain window and/or the frequency domain window according to the third synchronization signal.

In the embodiment of the invention, a correspondence relationship between a third synchronization signal and a sub-band or a TRP or a beam is determined in a predefined manner, or notified in the system information of the TRP group.

Further to any one of the embodiments above, the terminal further includes: a transmitting module 83 is configured to subsequently transmit data over a TRP or a sub-band or a beam in the TRP group according to the numerology determined by the numerology determining module.

Figure 9:
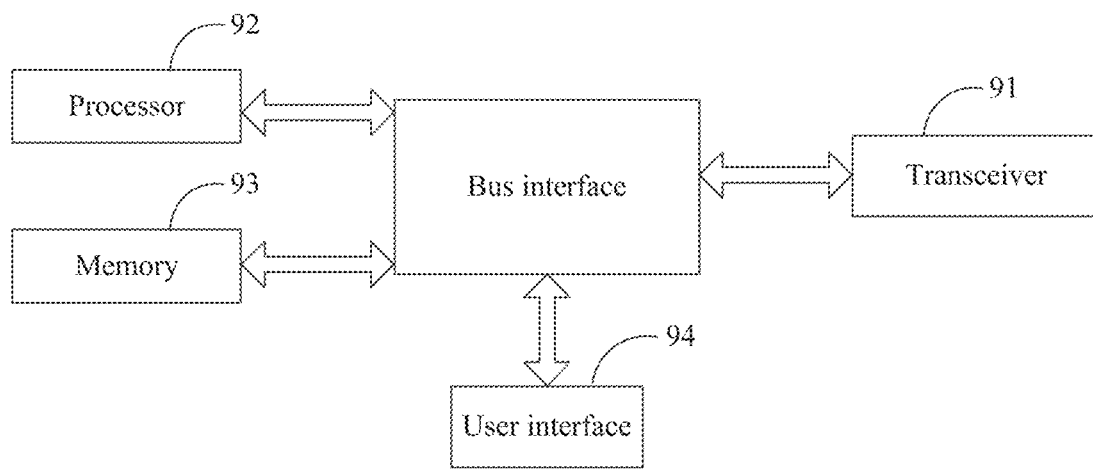
FIG. 9 is a schematic diagram of another terminal according to the embodiments of the invention.

FIG. 9 illustrates another terminal according to the embodiments of the invention, where the terminal includes a transceiver 91, and at least one processor 92 connected with the transceiver 91, where: the processor 92 is configured to read and execute program in a memory 93: to determine a Transmission Reception Point (TRP) group to which the terminal belongs according to a detected initial synchronization signal, where the initial synchronization signal includes a first synchronization signal and/or a second synchronization signal; and to determine a numerology according to a third synchronization signal detected in the TRP group, and/or system information of the TRP group; and the transceiver 91 is configured to receive and transmit data under the control of the processor 92.

In FIG. 9, the bus architecture can include any number of interconnecting buses and bridges to particularly link together various circuits including one or more processors represented by the processor 92, and one or more memories represented by the memory 93. The bus architecture can further link together various other circuits, e.g., a peripheral device, a manostat, a power management circuit, etc., all of which are well known in the art, so a further description thereof will be omitted in this context. The bus interface serves as an interface. The transceiver 91 can be one or more elements, e.g., a plurality of transmitters and receivers, which are units for communication with various other devices over a transmission medium. For different user equipments, a user interface 94 can also be an interface via which devices are connected internally and externally as needed, and the connected devices include but will not be limited to a keypad, a monitor, a speaker, a microphone, a joystick, etc. The processor 92 is responsible for managing the bus architecture and performing normal processes, and provides various functions including timing, peripheral interfaces, voltage regulation, power management, and other control functions. The memory 93 can store data for use by the processor 92 in performing the operations.

Optionally the processor 92 can be a Central Processing Unit (CPU), an Application Specific Integrated Circuit (ASIC), a Field Programmable Gate Array (FPGA), or a Complex Programmable Logic Device (CPLD).

In this embodiment, the processor 92 is configured to read the program in the memory 93 to particularly perform the method according to the embodiment as illustrated in FIG. 2A, and reference can be made to the related description in the embodiment as illustrated in FIG. 2A, so a repeated description thereof will be omitted here.

Based upon the same inventive idea, embodiments of the invention provides a network-side device, and since the device addresses the problem under a similar principle to the method according to the embodiment as illustrated in FIG. 2B, reference can be made to the implementation of the method for an implementation of the device, and a repeated description thereof will be omitted here.

Figure 10:
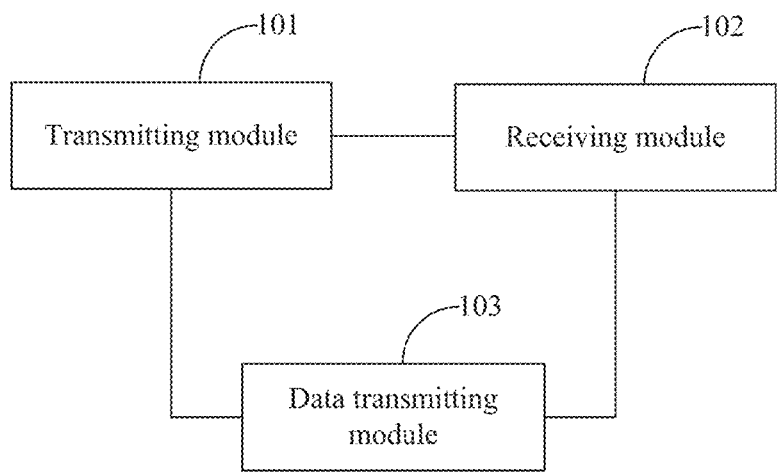
FIG. 10 is a schematic diagram of a network-side device according to the embodiments of the invention.

FIG. 10 illustrates a network-side device according to an embodiment of the invention, where the network-side device belongs to a Transmission and Reception Point (TRP) group, and includes: a transmitting module 101 is configured to transmit an initial synchronization signal in the TRP group so that a terminal determines the TRP group to which the terminal belongs according to the initial synchronization signal, where the initial synchronization signal includes a first synchronization signal and/or a second synchronization signal; and/or to transmit a third synchronization signal, and/or system information of the TRP group, in the TRP group so that the terminal determines a numerology of the network-side device, or numerologies of network-side devices within the TRP group according to the third synchronization signal, and/or the system information of the TRP group.

In a possible implementation, the transmitting module 101 is further configured to: transmit the third synchronization signal in an operating bandwidth, corresponding to the network-side device, in a system bandwidth of the TRP group; or transmit the third synchronization signal over a predefined transmission resource of the third synchronization signal; or transmit the third synchronization signal over a transmission resource of the third synchronization signal indicated in the system information of the TRP group.

In a possible implementation, the transmitting module 101 is further configured to: determine a numerology corresponding to a frequency band on which the third synchronization signal is to be transmitted, according to a correspondence relationship between a frequency band and a numerology, and transmit the third synchronization signal according to the determined numerology; or determine, the third synchronization signal sequence corresponding to the numerology of the network-side device, according to a correspondence relationship, between a third synchronization signal sequence and a numerology, predefined, or indicated in the system information of the TRP group, and transmit the third synchronization signal sequence corresponding to the numerology of the network-side device according to a preset numerology, or any one of a plurality of numerologies defined in a communication system, or a numerology indicated in the system information of the TRP group, or the numerology of the network-side device; or determine, the third synchronization signal sequence corresponding to the network-side device, according to a correspondence relationship, between a third synchronization signal sequence and a network-side device, predefined, or indicated in the system information of the TRP group, and transmit the third synchronization signal sequence corresponding to the network-side device according to the numerology of the network-side device.

In a possible implementation, the system information of the TRP group includes at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, or a numerology for each network-side device in the TRP group over different time domain resources and/or frequency domain resources.

In a possible implementation, the system information of the TRP group indicates a correspondence relationship between a third synchronization signal sequence and a numerology; or the system information of the TRP group indicates a numerology or numerologies.

In a possible implementation, the system information of the TRP group indicates a transmission resource of the third synchronization signal.

In a possible implementation, the transmitting module 101 is further configured: to transmit specific system information of the network-side device according to a predefined numerology, or a numerology indicated in the system information of the TRP group, or a default numerology of the network-side device, where the specific system information includes at least one of: a numerology for the network-side device, a numerology for each beam in the network-side device, or a numerology for the network-side device over different time domain resources and/or frequency domain resources.

Further to any one of the embodiments above, the device further includes a receiving module 102 configured to receive a plurality of third synchronization signal sequences reported by the terminal, and to select one or more of the plurality of third synchronization signal sequences; and the transmitting module 101 is further configured to notify the terminal of the third synchronization signal sequence or sequences selected by the receiving module.

Further to any one of the embodiments above, the device further includes a data transmitting module 103 configured to subsequently transmit data in an operating bandwidth of the network-side device according to the numerology of the network-side device.

Further to any one of the embodiments above, the network-side device is a TRP or a base station in the TRP group.

Figure 11:
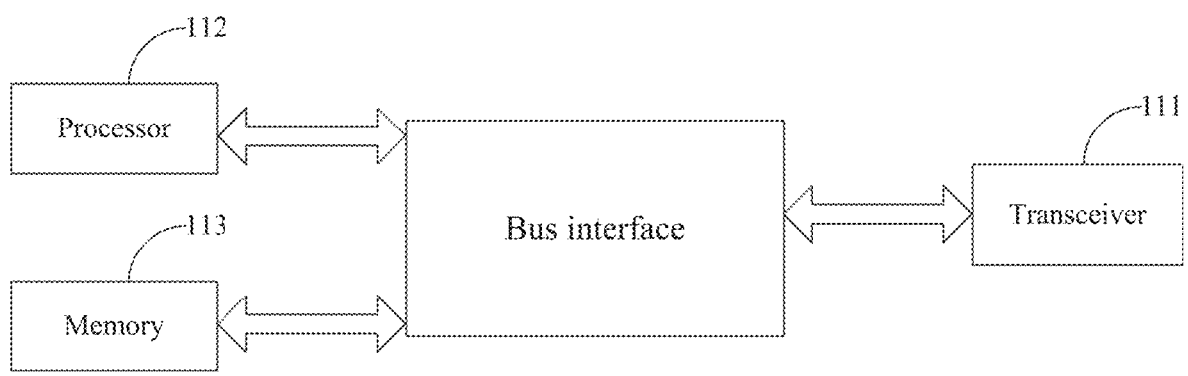
FIG. 11 is a schematic diagram of another network-side device according to the embodiments of the invention.

FIG. 11 illustrates another network-side device according to embodiments of the invention, where the network-side device includes a transceiver 111, and at least one processor 112 connected with the transceiver 111, where: the processor 112 is configured to read and execute program in a memory 113: to control the transceiver 111 to transmit an initial synchronization signal in the TRP group so that a terminal determines a TRP group to which the terminal belongs according to the initial synchronization signal, where the initial synchronization signal includes a first synchronization signal and/or a second synchronization signal; and/or to control the transceiver 111 to transmit a third synchronization signal, and/or system information of the TRP group, in the TRP group so that the terminal determines a numerology of the network-side device, or numerologies of network-side devices within the TRP group according to the third synchronization signal, and/or the system information of the TRP group; and the transceiver 111 is configured to receive and transmit data under the control of the processor 112.

Here in FIG. 11, the bus architecture can include any number of interconnecting buses and bridges to particularly link together various circuits including one or more processors represented by the processor 112, and one or more memories represented by the memory 113. The bus architecture can further link together various other circuits, e.g., a peripheral device, a manostat, a power management circuit, etc., all of which are well known in the art, so a further description thereof will be omitted in this context. The bus interface serves as an interface. The transceiver 111 can be a number of elements, e.g., a transmitter and a receiver, which are units for communication with various other devices over a transmission medium. The processor 112 is responsible for managing the bus architecture and performing normal processes, and provides various functions including timing, peripheral interfaces, voltage regulation, power management, and other control functions. The memory 113 can store data for use by the processor 112 in performing the operations.

Optionally the processor 112 can be a CPU, an ASIC, an FPGA, or a CPLD.

In this embodiment, the processor 112 is configured to read the program in the memory 113 to particularly perform the method according to the embodiment as illustrated in FIG. 2A, and reference can be made to the related description in the embodiment as illustrated in FIG. 2B, so a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine, so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a numerology, comprising:
   detecting, by a terminal, an initial synchronization signal according to a default numerology;
   determining, by the terminal, a Transmission Reception Point (TRP) group to which the terminal belongs according to the detected initial synchronization signal, wherein the initial synchronization signal comprises a first synchronization signal and/or a second synchronization signal; and
   determining, by the terminal, a numerology according to a third synchronization signal detected in the TRP group, and/or system information of the TRP group, wherein the numerology comprises at least a subcarrier spacing;
   wherein there is a correspondence relationship between a default numerology and a frequency band, and the detecting, by the terminal, the initial synchronization signal according to the default numerology comprises:
   determining, by the terminal, a numerology corresponding to a frequency band on which the initial synchronization signal is to be detected by the terminal, according to the correspondence relationship; and
   detecting, by the terminal, the initial synchronization signal on the frequency band on which the initial synchronization signal is to be detected, according to the determined numerology.

2. The method according to claim 1, wherein before the determining, by the terminal, the numerology according to the third synchronization signal detected in the TRP group, and/or the system information of the TRP group, the method further comprises:
   detecting, by the terminal, the third synchronization signal according to one of the following ways:
   detecting, by the terminal, the third synchronization signal on a system bandwidth of the TRP group; or detecting, by the terminal, the third synchronization signal on a predefined transmission resource of the third synchronization signal; or detecting, by the terminal, the third synchronization signal on a transmission resource of the third synchronization signal, indicated in the system information of the TRP group;

and/or detecting, by the terminal, the third synchronization signal according to one of the following ways:

detecting, by the terminal, the third synchronization signal according to a preset numerology; or determining, by the terminal, a numerology corresponding to a frequency band on which the third synchronization signal is to be detected, according to a correspondence relationship between a frequency band and a numerology, and detecting the third synchronization signal according to the determined numerology; or detecting, by the terminal, the third synchronization signal according to numerologies supported in a communication system; or detecting, by the terminal, the third synchronization signal according to a numerology indicated in the system information of the TRP group; or determining, by the terminal, according to a predefined correspondence relationship between third synchronization signal sequences and numerologies for sub-bands or TRPs or beams, a numerology of each third synchronization signal sequence; and detecting the third synchronization signal according to the determined numerology; or determining, by the terminal, according to a correspondence relationship between third synchronization signal sequences, and numerologies for sub-bands or TRPs or beams, indicated in the system information of the TRP group, a numerology of each third synchronization signal sequence; and detecting the third synchronization signal according to the determined numerology.

3. The method according to claim 1, wherein the determining, by the terminal, the numerology according to the third synchronization signal detected in the TRP group, and/or the system information of the TRP group comprises:

determining, by the terminal, a numerology used by the detected third synchronization signal as a numerology for a sub-band, a TRP, and/or a beam corresponding to the third synchronization signal; or determining, by the terminal, a numerology for a sub-band, a TRP, and/or a beam corresponding to a detected third synchronization signal sequence according to a predefined correspondence relationship between a third synchronization signal sequence and a numerology for a sub-band or a TRP or a beam; or receiving, by the terminal, TRP-specific system information transmitted by a TRP corresponding to the detected third synchronization signal according to a preset numerology, and determining the numerology according to the TRP-specific system information; or determining, by the terminal, a numerology for a sub-band, a TRP, and/or a beam corresponding to a detected third synchronization signal sequence according to a correspondence relationship between a third synchronization signal sequence and a numerology for a sub-band or a TRP or a beam, indicated in the system information of the TRP group; or receiving, by the terminal, TRP-specific system information transmitted by a TRP corresponding to the detected third synchronization signal according to a numerology indicated in the system information of the TRP group, and determining the numerology according to the TRP-specific system information;

wherein the TRP-specific system information comprises at least one of: a numerology for the TRP, a numerology for each beam in the TRP, or a numerology for the TRP over different time domain resources and/or frequency domain resources;

and/or determining, by the terminal, the numerology according to the system information of the TRP group comprises:

receiving, by the terminal, the system information of the TRP group, wherein the system information of the TRP group comprises at least one of: a numerology for a sub-band corresponding to the TRP group, a numerology for a time domain resource and/or a frequency domain resource corresponding to the TRP group, a numerology for a TRP in the TRP group, or a numerology for a beam corresponding to the TRP group.

4. The method according to claim 3, wherein when a quantity of detected third synchronization signal sequences is at least two, determining, by the terminal, the numerology comprises:

determining, by the terminal, a numerology for a sub-band, a TRP, and/or a beam corresponding to each third synchronization sequence; or selecting, by the terminal, at least one of the at least two third synchronization signal sequences, and determining a numerology for a sub-band, a TRP, and/or a beam corresponding to the selected third synchronization signal sequence.

5. The method according to claim 4, wherein the selecting, by the terminal, the at least one of the at least two third synchronization signal sequences comprises:

selecting, by the terminal, the at least one of the at least two third synchronization signal sequences according to received energies, signal strengths, and/or received qualities of the at least two third synchronization signal sequences; or reporting, by the terminal, the at least two third synchronization signal sequences to a network-side, and receiving the at least one of the at least two third synchronization signal sequences notified by the network-side.

6. The method according to claim 2, wherein the transmission resource is a time domain resource and/or a frequency domain resource occupied by the third synchronization signal, or a time domain window and/or a frequency domain window for detecting the third synchronization signal.

7. The method according to claim 6, wherein when the transmission resource is the time domain resource and/or the frequency domain resource occupied by the third synchronization signal, then the terminal detects the third synchronization signal according to a synchronization relationship, between the terminal and the TRP group, determined based upon the initial synchronization signal; and when the transmission resource is the time domain window and/or the frequency domain window for detecting the third synchronization signal, then the terminal detects blindly within the time domain window and/or the frequency domain window for the third synchronization signal, and obtains a synchronization relationship between the terminal, and a sub-band or a TRP or a beam corresponding to the time domain window and/or the frequency domain window according to the third synchronization signal.

8. A method for determining a numerology, comprising:
transmitting, by a first network-side device in a Transmission Reception Point (TRP) group, an initial synchronization signal in the TRP group, to enable a terminal to detect the initial synchronization signal according to a default numerology and determine the TRP group to which the terminal belongs, according to the detected initial synchronization signal, wherein the initial synchronization signal comprises a first synchronization signal and/or a second synchronization signal; and transmitting, by a second network-side device in the TRP group, a third synchronization signal in the TRP group, and/or transmitting, by a third network-side device in the TRP group, system information of the TRP group in the TRP group, so that the terminal determines a numerology of the second network-side device, or numerologies of network-side devices within the TRP group according to the third synchronization signal and/or the system information of the TRP group, wherein the numerology comprises at least a subcarrier spacing;

wherein there is a correspondence relationship between a default numerology and a frequency band, and detecting, by the terminal, the initial synchronization signal according to the default numerology comprises:

determining, by the terminal, a numerology corresponding to a frequency band on which the initial synchronization signal is to be detected by the terminal, according to the correspondence relationship; and detecting, by the terminal, the initial synchronization signal on the frequency band on which the initial synchronization signal is to be detected, according to the determined numerology.

9. The method according to claim 8, wherein transmitting, by the second network-side device in the TRP group, the third synchronization signal in the TRP group according to one of the following ways:

transmitting, by the second network-side device, the third synchronization signal in an operating bandwidth corresponding to the second network-side device, in a system bandwidth of the TRP group; or transmitting, by the second network-side device, the third synchronization signal over a predefined transmission resource of the third synchronization signal; or transmitting, by the second network-side device, the third synchronization signal over a transmission resource of the third synchronization signal indicated in the system information of the TRP group;

and/or transmitting, by the second network-side device in the TRP group, the third synchronization signal in the TRP group according to one of the following ways:

determining, by the second network-side device, a numerology corresponding to a frequency band on which the third synchronization signal is to be transmitted, according to a correspondence relationship between a frequency band and a numerology, and transmitting the third synchronization signal according to the determined numerology; or determining, by the second network-side device, a third synchronization signal sequence corresponding to the numerology of the second network-side device, according to a correspondence relationship, between a third synchronization signal sequence and a numerology, predefined, or indicated in the system information of the TRP group, and transmitting the third synchronization signal sequence corresponding to the numerology of the second network-side device according to a preset numerology, or any one of a plurality of numerologies defined in a communication system, or a numerology indicated in the system information of the TRP group, or the numerology of the second network-side device; or determining, by the second network-side device, a third synchronization signal sequence corresponding to the second network-side device, according to a correspondence relationship, between a third synchronization signal sequence and a network-side device, predefined, or indicated in the system information of the TRP group, and transmitting the third synchronization signal sequence corresponding to the second network-side device according to the numerology of the second network-side device.

10. The method according to claim 8, wherein the system information of the TRP group comprises at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, or a numerology for each network-side device in the TRP group over different time domain resources and/or frequency domain resources.

11. The method according to claim 8, wherein the system information of the TRP group indicates a correspondence relationship between a third synchronization signal sequence and a numerology; or the system information of the TRP group indicates a numerology or numerologies; or the system information of the TRP group indicates a transmission resource of the third synchronization signal.

12. The method according to claim 8, wherein the method further comprises:

transmitting, by the second network-side device, specific system information of the second network-side device according to a predefined numerology, or a numerology indicated in the system information of the TRP group, or a default numerology of the second network-side device, wherein the specific system information comprises at least one of: a numerology for the second network-side device, a numerology for each beam in the second network-side device, or a numerology for the second network-side device over different time domain resources and/or frequency domain resources;

and/or receiving, by the second network-side device or the third network-side device, a plurality of third synchronization signal sequences reported by the terminal, selecting one or more of the plurality of third synchronization signal sequences, and notifying the terminal of the selected third synchronization signal sequence or sequences;

and/or the first network-side device or the second network-side device or the third network-side device is a TRP or a base station in the TRP group.

13. A terminal, comprising a transceiver, and at least one processor connected with the transceiver, wherein the at least one processor is configured to read and execute program in a memory to:

detect an initial synchronization signal according to a default numerology;

determine a Transmission Reception Point (TRP) group to which the terminal belongs according to the detected initial synchronization signal, wherein the initial synchronization signal comprises a first synchronization signal and/or a second synchronization signal; and determine a numerology according to a third synchronization signal detected in the TRP group, and/or system information of the TRP group, wherein the numerology comprises at least a subcarrier spacing;

wherein there is a correspondence relationship between a default numerology and a frequency band, and the at least one processor is further configured to read and execute the program in the memory to:

determine a numerology corresponding to a frequency band on which the initial synchronization signal is to be detected by the terminal, according to the correspondence relationship; and detect the initial synchronization signal on the frequency band on which the initial synchronization signal is to be detected, according to the determined numerology.

14. The terminal according to claim 13, wherein the at least one processor is further configured to read and execute the program in the memory to:

detect the third synchronization signal on a system bandwidth of the TRP group; or detect the third synchronization signal on a predefined transmission resource of the third synchronization signal; or detect the third synchronization signal on a transmission resource of the third synchronization signal, indicated in the system information of the TRP group;

and/or the at least one processor is further configured to read and execute the program in the memory to:

detect the third synchronization signal according to a preset numerology; or determine a numerology corresponding to a frequency band on which the third synchronization signal is to be detected, according to a correspondence relationship between a frequency band and a numerology, and detect the third synchronization signal according to the determined numerology; or detect the third synchronization signal according to numerologies supported in a communication system; or detect the third synchronization signal according to a numerology indicated in the system information of the TRP group; or determine, according to a predefined correspondence relationship between third synchronization signal sequences and numerologies for sub-bands or TRPs or beams, a numerology of each third synchronization signal sequence; and detect the third synchronization signal according to the determined numerology; or determine, according to a correspondence relationship between third synchronization signal sequences, and numerologies for sub-bands or TRPs or beams, indicated in the system information of the TRP group, a numerology of each third synchronization signal sequence; and detect the third synchronization signal according to the determined numerology.

15. The terminal according to claim 13, wherein the at least one processor is configured to read and execute the program in the memory to:

determine a numerology used by the detected third synchronization signal as a numerology for a sub-band, a TRP, and/or a beam corresponding to the third synchronization signal; or determine a numerology for a sub-band, a TRP, and/or a beam corresponding to a detected third synchronization signal sequence according to a predefined correspondence relationship between a third synchronization signal sequence and a numerology for a sub-band or a TRP or a beam; or receive TRP-specific system information transmitted by a TRP corresponding to the detected third synchronization signal according to a preset numerology, and determine the numerology according to the TRP-specific system information; or determine a numerology for a sub-band, a TRP, and/or a beam corresponding to a detected third synchronization signal sequence according to a correspondence relationship between a third synchronization signal sequence and a numerology for a sub-band or a TRP or a beam, indicated in the system information of the TRP group; or receive TRP-specific system information transmitted by a TRP corresponding to the detected third synchronization signal according to a numerology indicated in the system information of the TRP group, and determine the numerology according to the TRP-specific system information;

wherein the TRP-specific system information comprises at least one of: a numerology for the TRP, a numerology for each beam in the TRP, or a numerology for the TRP over different time domain resources and/or frequency domain resources;

and/or receive the system information of the TRP group, wherein the system information of the TRP group includes at least one of: a numerology for a sub-band corresponding to the TRP group, a numerology for a time domain resource and/or a frequency domain resource corresponding to the TRP group, a numerology for a TRP in the TRP group, or a numerology for a beam corresponding to the TRP group.

16. The terminal according to claim 15, wherein when a quantity of detected third synchronization signal sequences is at least two, the at least one processor is configured to read and execute the program in the memory to:

determine a numerology for a sub-band, a TRP, and/or a beam corresponding to each third synchronization sequence; or select at least one of the at least two third synchronization signal sequences, and determine a numerology for a sub-band, a TRP, and/or a beam corresponding to the selected third synchronization signal sequence.

17. The terminal according to claim 16, wherein the at least one processor is configured to read and execute the program in the memory to:

select the at least one of the at least two third synchronization signal sequences according to received energies, signal strengths, and/or received qualities of the at least two third synchronization signal sequences; or report the at least two third synchronization signal sequences to a network-side, and receive the at least one of the at least two third synchronization signal sequences notified by the network-side.

18. The terminal according to claim 14, wherein the transmission resource is a time domain resource and/or a frequency domain resource occupied by the third synchronization signal, or a time domain window and/or a frequency domain window for detecting the third synchronization signal.

19. The terminal according to claim 18, wherein when the transmission resource is the time domain resource and/or the frequency domain resource occupied by the third synchronization signal, then the at least one processor is configured to read and execute the program in the memory to detect the third synchronization signal according to a synchronization relationship, between the terminal and the TRP group, determined based upon the initial synchronization signal; and when the transmission resources is the time domain window and/or the frequency domain window for detecting the third synchronization signal, then the at least one processor is configured to read and execute the program in the memory to detect blindly within the time domain window and/or the frequency domain window for the third synchronization signal, and to obtain a synchronization relationship between the terminal, and a sub-band or a TRP or a beam corresponding to the time domain window and/or the frequency domain window according to the third synchronization signal.

20. A network-side device, belonging to a Transmission Reception Point (TRP) group, and comprising a transceiver, and at least one processor connected with the transceiver, wherein the processor is configured to read and execute program in a memory to:

transmit an initial synchronization signal in the TRP group, to enable a terminal to detect the initial synchronization signal according to a default numerology and determine the TRP group to which the terminal belongs, according to the detected initial synchronization signal, wherein the initial synchronization signal comprises a first synchronization signal and/or a second synchronization signal; and transmit a third synchronization signal, and/or system information of the TRP group, in the TRP group, so that the terminal determines a numerology of the network-side device, or numerologies of network-side devices within the TRP group according to the third synchronization signal and/or the system information of the TRP group, wherein the numerology comprises at least a subcarrier spacing;

wherein there is a correspondence relationship between a default numerology and a frequency band, and detecting, by the terminal, the initial synchronization signal according to the default numerology comprises:

determining, by the terminal, a numerology corresponding to a frequency band on which the initial synchronization signal is to be detected by the terminal, according to the correspondence relationship; and detecting, by the terminal, the initial synchronization signal on the frequency band on which the initial synchronization signal is to be detected, according to the determined numerology.

21. The device according to claim 20, wherein the at least one processor is configured to read and execute the program in the memory to:

control the transceiver to transmit the third synchronization signal in an operating bandwidth, corresponding to the network-side device, in a system bandwidth of the TRP group; or control the transceiver to transmit the third synchronization signal over a predefined transmission resource of the third synchronization signal; or control the transceiver to transmit the third synchronization signal over a transmission resource of the third synchronization signal indicated in the system information of the TRP group;

and/or the at least one processor is configured to read and execute the program in the memory to:

determine a numerology corresponding to a frequency band on which the third synchronization signal is to be transmitted, according to a correspondence relationship between a frequency band and a numerology, and control the transceiver to transmit the third synchronization signal according to the determined numerology; or determine, a third synchronization signal sequence corresponding to the numerology of the network-side device, according to a correspondence relationship, between a third synchronization signal sequence and a numerology, predefined, or indicated in the system information of the TRP group, and control the transceiver to transmit the third synchronization signal sequence corresponding to the numerology of the network-side device according to a preset numerology, or any one of a plurality of numerologies defined in a communication system, or a numerology indicated in the system information of the TRP group, or the numerology of the network-side device; or determine, a third synchronization signal sequence corresponding to the network-side device, according to a correspondence relationship, between a third synchronization signal sequence and a network-side device, predefined, or indicated in the system information of the TRP group, and control the transceiver to transmit the third synchronization signal sequence corresponding to the network-side device according to the numerology of the network-side device.

22. The device according to claim 20, wherein the system information of the TRP group comprises at least one of: a numerology for a sub-band corresponding to the TRP group, a numerology for a time domain resource and/or a frequency domain resource corresponding to the TRP group, a numerology for a beam corresponding to the TRP group, a numerology for each network-side device in the TRP group, a numerology for each beam of each network-side device in the TRP group, or a numerology for each network-side device in the TRP group over different time domain resources and/or frequency domain resources.

23. The device according to claim 20, wherein the system information of the TRP group indicates a correspondence relationship between a third synchronization signal sequence and a numerology; or the system information of the TRP group indicates a numerology or numerologies; or the system information of the TRP group indicates a transmission resource of the third synchronization signal.

24. The device according to claim 20, wherein the at least one processor is further configured to read and execute the program in the memory to:

control the transceiver to transmit specific system information of the network-side device according to a predefined numerology, or a numerology indicated in the system information of the TRP group, or a default numerology of the network-side device, wherein the specific system information comprises at least one of: a numerology for the network-side device, a numerology for each beam in the network-side device, or a numerology for the network-side device over different time domain resources and/or frequency domain resources;

and/or control the transceiver to receive a plurality of third synchronization signal sequences reported by the terminal, and select one or more of the plurality of third synchronization signal sequences; and control the transceiver to notify the terminal of the selected third synchronization signal sequence or sequences;

and/or the network-side device is a TRP or a base station in the TRP group.

* * * * *